United States Patent
Mishra et al.

(10) Patent No.: US 11,593,298 B2
(45) Date of Patent: Feb. 28, 2023

(54) RECONFIGURABLE NETWORK-ON-CHIP SECURITY ARCHITECTURE

(71) Applicant: University of Florida Research Foundation, Inc., Gainesville, FL (US)

(72) Inventors: Prabhat Kumar Mishra, Gainesville, FL (US); Thelijjagoda S N Charles, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 250 days.

(21) Appl. No.: 17/092,703

(22) Filed: Nov. 9, 2020

(65) Prior Publication Data
US 2021/0149837 A1   May 20, 2021

Related U.S. Application Data

(60) Provisional application No. 62/937,858, filed on Nov. 20, 2019.

(51) Int. Cl.
| | |
|---|---|
| *G06F 1/24* | (2006.01) |
| *G06F 9/00* | (2006.01) |
| *G06F 15/78* | (2006.01) |
| *G06F 21/55* | (2013.01) |
| *G06F 21/71* | (2013.01) |

(52) U.S. Cl.
CPC ...... *G06F 15/7882* (2013.01); *G06F 15/7807* (2013.01); *G06F 21/554* (2013.01); *G06F 21/71* (2013.01); *G06F 2221/034* (2013.01)

(58) Field of Classification Search
CPC ............ G06F 15/7882; G06F 15/7807; G06F 21/554; G06F 21/71; G06F 2221/034; G06F 15/7825
See application file for complete search history.

(56) References Cited

U.S. PATENT DOCUMENTS

| | | | | |
|---|---|---|---|---|
| 2006/0005014 | A1* | 1/2006 | Aura ................... | H04L 63/0823 713/162 |
| 2013/0191649 | A1* | 7/2013 | Muff ................... | G06F 12/1408 707/693 |

(Continued)

OTHER PUBLICATIONS

Subodha Charles et al. "Real-Time Detection and Localization of Distributed DoS Attacks in NoC-Based SoCs". IEEE Transactions On Computer-Aided Design Of Integrated Circuits And Systems. vol. 39, No. 12. pp. 4510-4523. Dec. 2020.

*Primary Examiner* — Xuxing Chen
(74) *Attorney, Agent, or Firm* — Thomas | Horstemeyer, LLP

(57) ABSTRACT

The present disclosure presents an exemplary tier-based reconfigurable security architecture that can adapt to different use-case scenarios by selecting security tiers and configure parameters in each security tier based on system requirements. An exemplary system comprises a security agent that is configured to monitor system characteristics of embedded components on a system-on-chip and communicate a status of the system characteristics to a reconfigurable service engine integrated on the system-on-chip, such that the reconfigurable service engine is configured to activate one of a plurality of tiers of security based at least upon the status of the system characteristics communicated.

20 Claims, 11 Drawing Sheets

(56) References Cited

U.S. PATENT DOCUMENTS

2015/0254189 A1\* 9/2015 Coppola ............. G06F 9/45533
                                                      711/163
2018/0006938 A1\* 1/2018 Meyer ..................... H04L 45/74
2018/0039777 A1\* 2/2018 Loh ..................... H04L 63/1458

\* cited by examiner

RECONFIGURABLE NETWORK-ON-CHIP SECURITY ARCHITECTURE

CROSS-REFERENCE TO RELATED APPLICATION

This application claims priority to U.S. provisional application entitled, "Reconfigurable Network-On-Chip Security Architecture," having Ser. No. 62/937,858, filed Nov. 20, 2019, which is entirely incorporated herein by reference.

STATEMENT REGARDING FEDERALLY SPONSORED RESEARCH OR DEVELOPMENT

This invention was made with government support under 1936040 awarded by the National Science Foundation. The government has certain rights in the invention.

BACKGROUND

The growth of Internet-of-things (IoT) has led to complex system-on-chips (SoC) being used in the edge devices in IoT applications. The increased complexity is demanding designers to consider several critical factors such as dynamic requirement changes, long application life, mass production, and tight time-to-market deadlines. SoC manufacturers outsource some of the intellectual property (IP) cores integrated on the SoC to untrusted third party vendors. The untrusted IPs can contain malicious implants, which can launch attacks using the resources provided by the on-chip interconnection network, commonly known as the network-on-chip (NoC). Existing efforts on securing NoC have considered lightweight encryption, authentication, and other attack detection mechanisms, such as denial-of-service (DoS) and buffer overflows. Unfortunately, these approaches focus on designing statically optimized security solutions. As a result, they are not suitable for many IoT systems with long application life and dynamic requirement changes.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

There is a need to design reconfigurable security architectures that can be dynamically tuned based on changing requirements. In the present disclosure, an exemplary tier-based reconfigurable security architecture that can adapt to different use-case scenarios by selecting security tiers and configure parameters in each security tier based on system requirements is disclosed. For example, various embodiments of the reconfigurable security architecture can support multiple NoC security mechanisms (e.g., encryption, authentication, and DoS attack detection & localization) and implement suitable dynamic reconfiguration techniques. The present disclosure presents an evaluation of an exemplary reconfigurable security system architecture by running standard benchmarks enabling different tiers of security and provides a comprehensive analysis of how different levels of security can affect application performance, energy efficiency, and area overhead.

Today, we are living in the era of Internet-of-things (IoT), an era in which the number of connected devices exceeds the human population. The growth of IoT has been astounding over the last couple of decades leading to projections of more than 50 billion connected devices by 2020. In addition to the sheer number of connected devices, the complexity of these devices and different use cases in which we use them have grown remarkably. Not so long ago, our imagination was limited to phones and personal computers that can run few custom applications. Now, we are developing devices that are fundamentally integrated in our day-to-day life ranging from fitness trackers, smart homes, smart cars, and all the way to smart cities. Unlike the microcontroller based devices in the past, even resource-constrained IoT devices include one or more complex system-on-chips (SoC). The SoC components are connected by the interconnection network, known as network-on-chip (NoC). Given the rapid growth in the recent past, it is difficult to even comprehend what lies in the future. Because of this, designers of these devices face challenges at a scale not observed before.

In the early days of IoT and embedded devices, such devices were intended for a single or very few use cases. The requirements and working conditions were well defined and predictable. Therefore, it was easy to make design choices to fit the requirements. For example, a device for a power-thrifty application was designed to conserve power at the cost of performance, while a high-performance system exhibited a different, yet predictable trade-off. In comparison to that, the devices manufactured today are intended to serve general purpose applications that are diverse and sometimes, not yet defined. Therefore, it is not possible to statically optimize the devices to fit each use case.

Figure 1A:
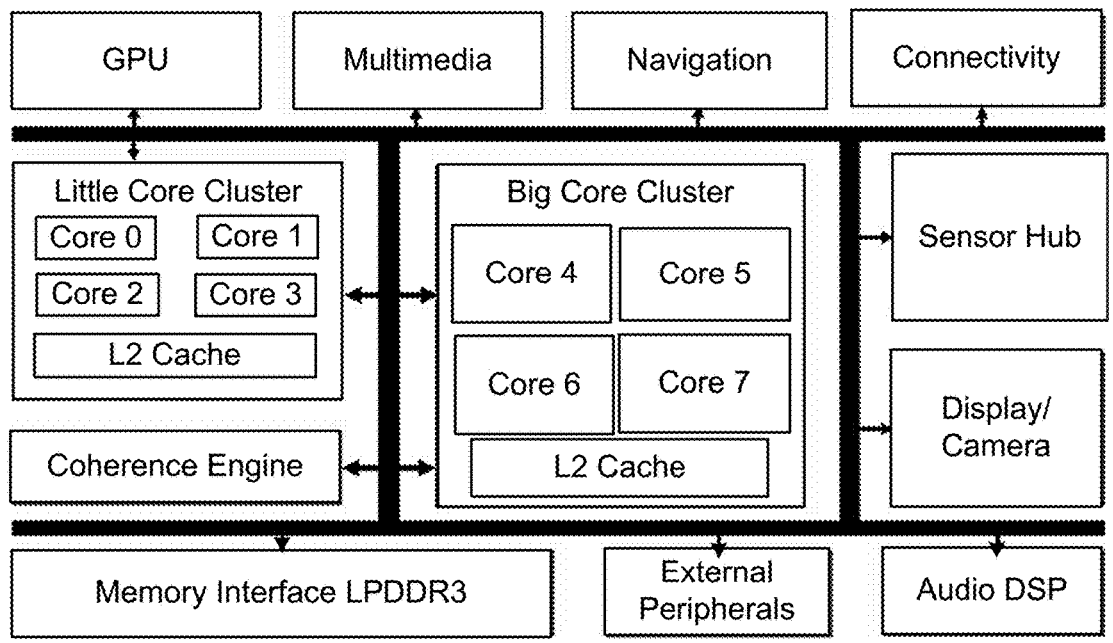
FIG. 1A shows an architecture view an Internet of Things (IoT) System-on-Chip (SOC) architecture that has been optimized during design time based on application characteristics in accordance with the present disclosure.
Figure 1B:
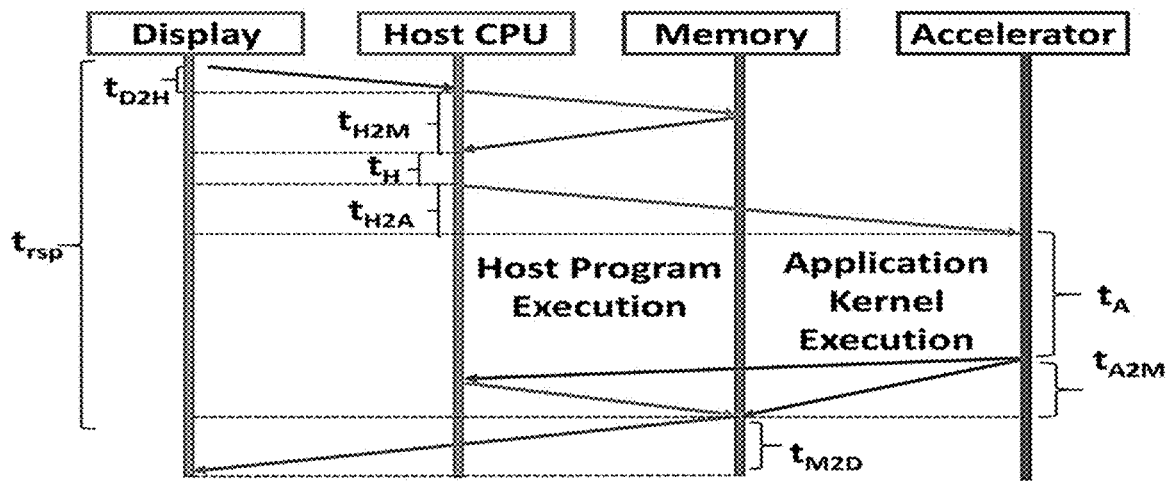
FIG. 1B shows a resource-centric application flow view of the application characteristics of FIG. 1A
Figure 1C:
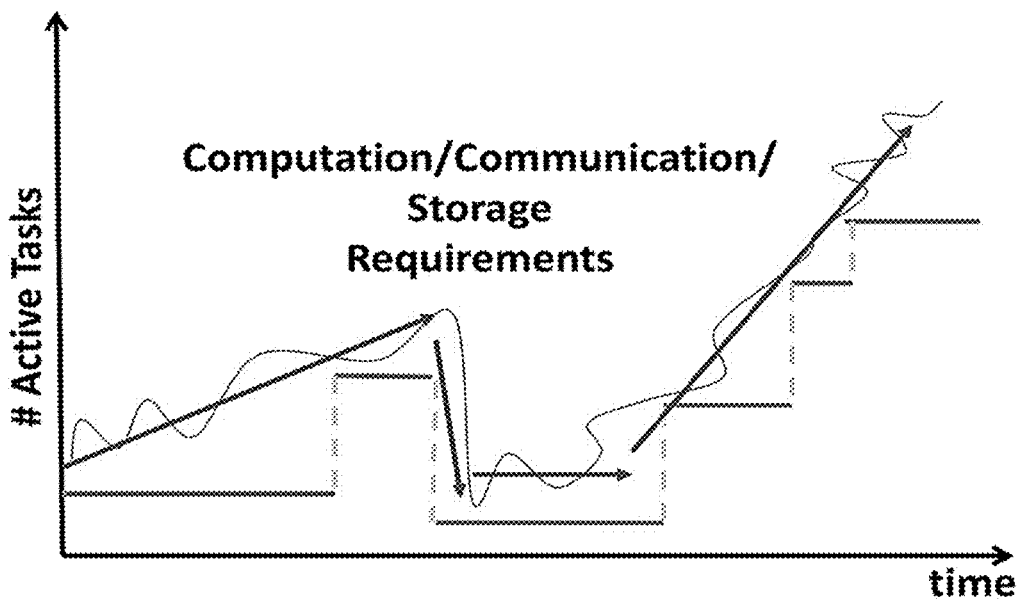
FIG. 1C is a graph showing run-time change in resource requirements during runtime of the SOC architecture of FIG. 1.

For example, FIG. 1A shows an IoT architecture that has been optimized during design time based on application characteristics shown in FIG. 1B. However, this design may not be beneficial during runtime due to changes in usage scenarios, changes in application inputs, and other parametric variations. Correspondingly, FIG. 1C shows that a runtime reconfiguration would be useful because the computation, communication, and storage requirements can change based on specific task execution traces (phases).

In the pre-IoT era, before devices were integrated to our everyday lives, the devices were only required to last for a few years. For example, in the case of a phone or a personal computer, new features will come into products within few years, or even few months and the previous models will become outdated. In contrast, if you are building a smart house or a smart grid, you expect them to last well over 10 years. However, the requirements of a smart system over a long life-span of 10+ years can change drastically. While a car equipped with the state-of-the-art security mechanisms will be secure in the present-day, the car will not be secure against future attacks. Such a system is secure until the zero-day vulnerability is exposed. Clearly, IoT devices should be adaptable on-field to changing application requirements.

The projection of 50 billion devices by 2020 can only happen if devices are introduced at a rapid pace. We already observe this in the market with devices being manufactured in very short periods. To achieve this, it is a common practice for SoC vendors to outsource several components of the SoC. This globally distributed supply chain of intellectual property (IP) cores make the SoCs vulnerable to trust and integrity issues. The potential space for SoC vulnerabilities is huge once we consider the seven classes of SoC-level security vulnerabilities: permissions and privileges, buffer errors, resource management, information leakage, numeric errors, crypto errors, and code injection. Based on Common Vulnerability Exposure (CVE-MITRE) estimates, if hardware-level vulnerabilities are removed, the overall system vulnerability will reduce by 43%. Therefore, securing systems against these potential threats throughout the device lifetime is a top priority.

Thus, it is evident that securing IoT devices based on complex SoCs throughout the device lifetime among changing requirements and use-case scenarios should be considered during design time. Due to the resource-constrained nature of IoT SoCs, it is not always feasible to enforce the strongest security mechanisms, since security has to be considered among other interoperability constraints such as performance, power, and area overheads. Besides, employing a full security arsenal may not be required depending on the application characteristics and use-case scenarios. For example, consider a smart watch that is used for browsing the Internet at home as well as in a public coffee shop. It may be okay to trust the wireless network at home and impose a light-weight security requirement in favor of a lower energy profile. However, a stronger security mechanism is necessary when communicating with the untrusted network in a coffee shop at the cost of power and performance. On the other hand, if the current state of the device battery is low, it might be desirable to compromise on security and save more power to ensure application execution. The trade-off between performance and energy is also integrated in modern-day smart phones by the introduction of "power-saver" modes.

Due to mass production and tight time-to-market deadlines, most SoC manufacturers outsource IP cores to third party vendors. These third party manufacturers are not always trustworthy. Their IPs might contain hardware Trojans and other malicious implants that can launch active as well as passive attacks on other legitimate components on the SoC once they are activated. These third party IPs are referred as "potentially malicious IPs." Due to the distributed nature of the NoC, MIPs (malicious IP cores) use resources offered by the NoC to launch attacks. To capture these scenarios, an exemplary embodiment of a security system in accordance with the present disclosure deploys a security system architecture and threat model as described below.

Figure 2:
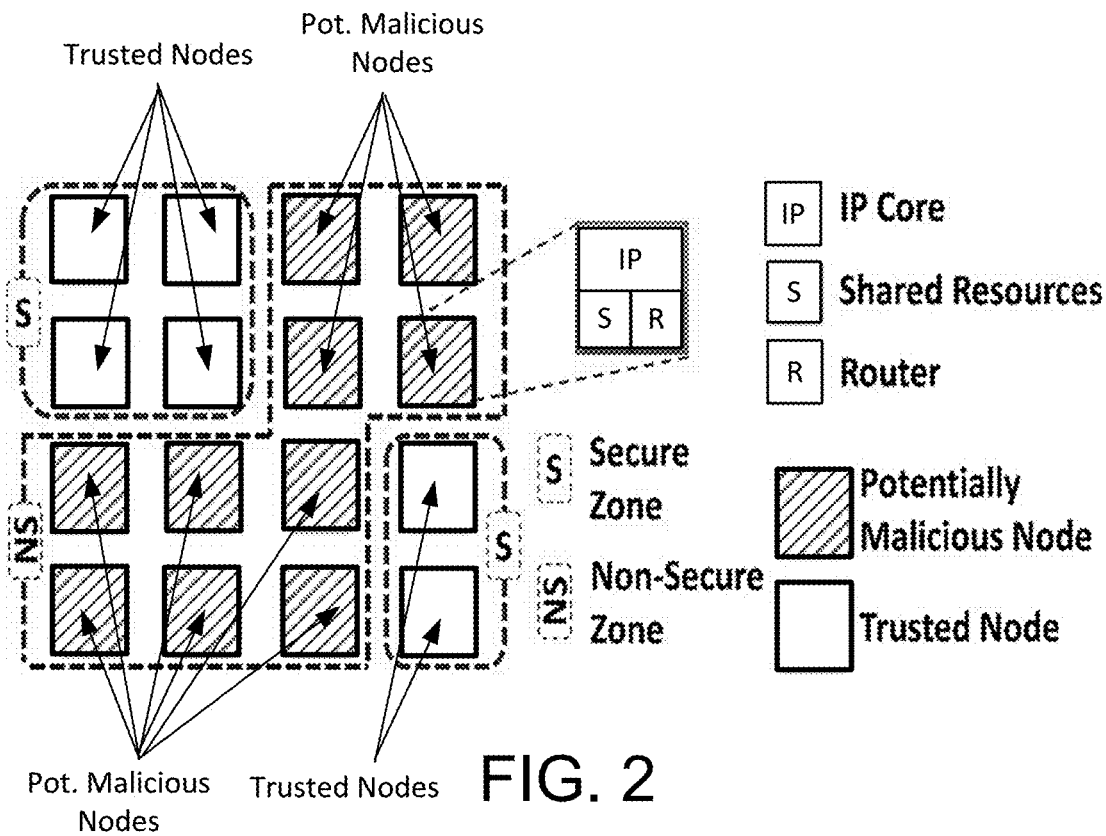
FIG. 2 shows a network on chip (NoC)-based SoC architecture model that is divided into secure and non-secure zones in accordance with embodiments of the present disclosure.

In various embodiments, an architecture model similar to the one shown in FIG. 2 is utilized. FIG. 2 shows an NoC-based SoC divided into secure and non-secure zones similar to the architecture proposed in the ARM TrustZone architecture. The secure zone comprises IPs that can be trusted to not contain malicious implants (secure IPs) and the non-secure zone contains IPs obtained by third party vendors (potentially malicious IPs), which cannot be trusted. An IP in one secure zone (top left) communicates secure information with a secure IP in the other zone (bottom right). Since the packets traverse through the non-secure zone, the presence of a MIP can pose a security threat.

Depending on increasing capabilities of MIPs, the threats are divided into tiers, as illustrated in Table 1 (below). Each tier is assumed to include the capabilities of the previous tier. For example, a MIP classified in tier 3 has capabilities of tier 1 and 2 as well.

TABLE 1

| Tier | Threats |
| --- | --- |
| Tier 1 | MIPs can eavesdrop on the packets traversing through the network. Copied packets can cause information leakage. |
| Tier 2 | MIPs can corrupt/spoof packets. Corrupted packets can lead to the erroneous execution of programs as well as system failures. Spoofed packets inject new packets to the |

TABLE 1-continued

| Tier | Threats |
|---|---|
| | network causing system to malfunction. Packets can be re-routed to MIPs to leak information. |
| Tier 3 | MIPs can launch denial-of-service (DoS) attacks on a critical component of the SoC causing significant performance degradation. |

Figure 3:
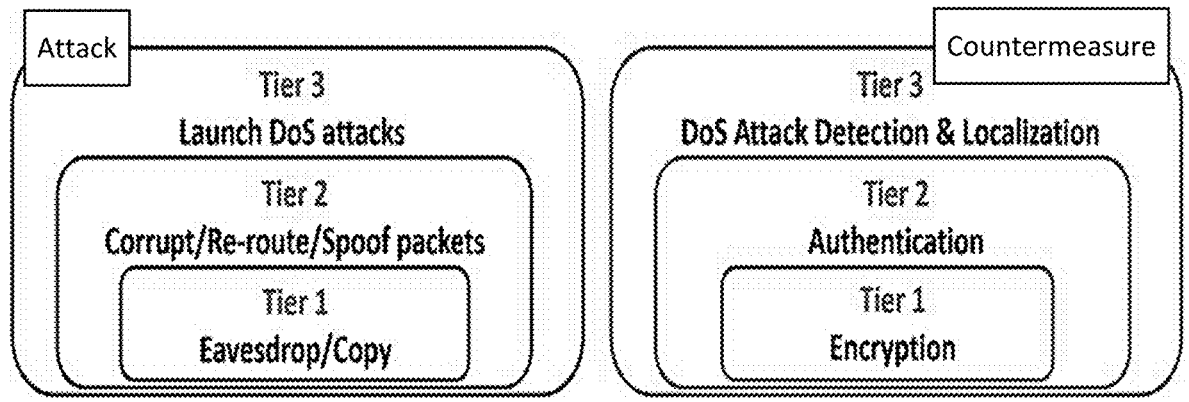
FIG. 3 is a chart illustrating potential attacks and corresponding countermeasures in an exemplary tier-based security architecture in accordance with embodiments of the present disclosure.

An exemplary reconfigurable security architecture is designed to secure the SoC against different capabilities of MIPs depending on the usage scenario. The goal is to ensure secure communication between secure IPs and to prevent any attacks. In accordance with the present disclosure, an exemplary security system provides a reconfigurable fabric that enables utilization of security primitives in a plug-and-play manner based on application requirements. To do so, a tier-based security architecture is implemented that allows reconfigurable security. Solutions offered for each tier are countermeasures for the capabilities of MIPs at each tier. An overview of possible attacks and corresponding countermeasures is shown in FIG. 3. As illustrated in the figure, the security architecture can be dynamically reconfigured based on changing application requirements.

In one embodiment, an exemplary reconfigurable security architecture includes a reconfigurable service engine (RSE) which is a dedicated IP on the SoC and security mechanisms implemented at routers and network interfaces (NI). While there are many possible security primitives, one exemplary embodiment of the reconfigurable security architecture utilizes three security primitives in NoCs (encryption, authentication. and DoS attack prevention). The security tiers are selected together with relevant parameters, in which, in one embodiment, each security tier is associated with reconfigurable parameters as shown in Table 2.

TABLE 2

| Security Primitive | Reconfigurable Parameters |
|---|---|
| Encryption (Tier 1) | Blockcipher, Key size, Block size, initialization vector (IV) length |
| Authentication (Tier 2) | Hash function, Key size, Input size |
| DoS attack detection and localization (Tier 3) | Detection only/Detection and Localization, Detection interval |

Figure 4:
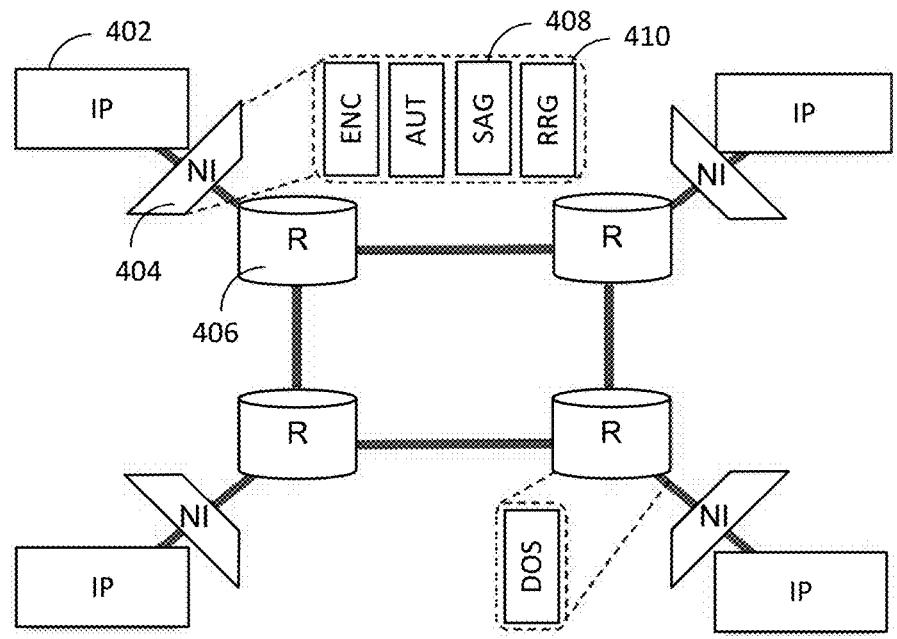
FIG. 4 shows an architecture view of an embodiment of an exemplary reconfigurable security architecture with encryption, authentication, security agent, and reconfigurable register components implemented at network interfaces and denial-of-service (DoS) attack detection components implemented at routers in accordance with the present disclosure.

In various embodiments, an exemplary reconfigurable security architecture has two main parts. (i) Tier-based security countermeasures and (ii) a reconfiguration mechanism. FIG. 4 shows how the security countermeasures are integrated in the NoC, in one embodiment. Accordingly, in accordance with embodiments of the present disclosure, the encryption and authentication tiers are integrated in the NI 404, whereas dedicated hardware for DoS attack detection and localization is implemented in each router 406 and IP core 402. The reconfiguration mechanism decides which security tier to activate and which parameters to pass to the selected tier based on the system characteristics as well as security requirements. Security tiers and parameters are selected using the reconfiguration registers (RRG) 412 integrated in each NI 404 which are modified by the reconfiguration mechanism. The reconfiguration mechanism has two types of components integrated in the SoC:

Security Agent (SAG): a security agent 408 is integrated in each NI 404. SAGs 408 monitor the network for potential security attacks and also check the system characteristics such as NoC congestion and battery life through sensors.

Reconfigurable Service Engine (RSE): a dedicated IP integrated on the SoC that contains security policies and takes decisions on when to reconfigure security based on the data given by SAGs 408.

FIG. 4 shows how the SAGs are integrated into each NI in accordance with embodiments of the present disclosure. In one embodiment, the SAGs offer three different services:
1. Gather data about system characteristics such as battery level and NoC congestion.
2. Pass messages received by security tiers to RSE. For example, if an ongoing DoS attack is detected, SAGs send that information to RSE which can take the decision on activating the localization component of security tier 3 to localize the attack.
3. Set the RRG 410 in each NI to indicate which tier of security to activate according to the decisions made by the RSE.

Figure 5:
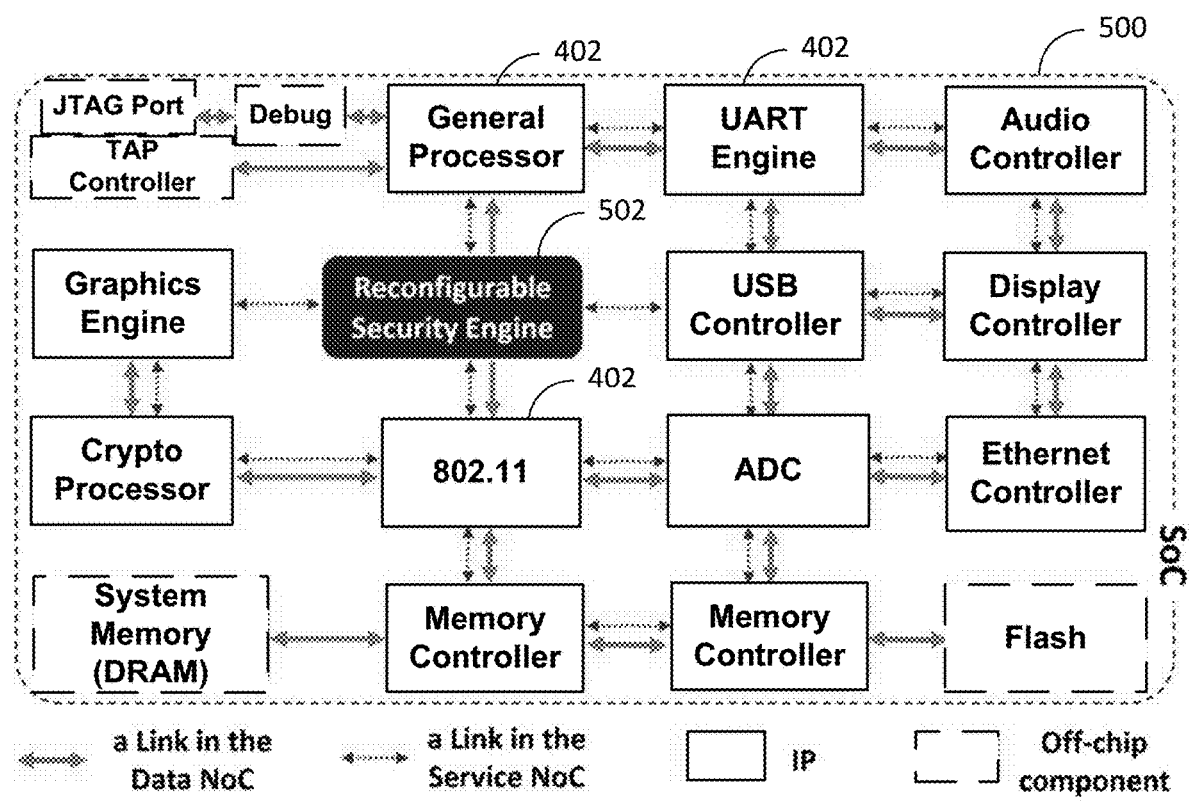
FIG. 5 shows a System-on-Chip including an exemplary reconfiguration service engine (RSE) in accordance with embodiments of the present disclosure.

FIG. 5 shows an overview of how the RSE 502 is connected on the SoC 500 in various embodiments. Correspondingly, Algorithm 1 (below) describes the main steps of reconfiguration. The RSE 502 periodically pings the SAGs 408 to gather data about system characteristics (line 2). This is called the security heartbeat. After gathering battery level and NoC congestion information, the RSE 502 then decides which security tier and parameters to activate based on its security policy and passes that data to the SAGs 408, who set the RRGs 410 (lines 11-14). In addition to decisions made at each security heartbeat, an SAG 408 can also interrupt the RSE 502 if a potential security threat is detected (line 6). RSE 502 will follow the same process and set the RRGs 410. RSE 502 and SAGs 408 communicate using a separate NoC, named the service NoC, that facilitates all packets transferred between the RSE 502 and SAGs 408 without interfering with the data transferred between IPs 402. The IPs 402 read the RRGs 410 to identify which security tier to activate together with its parameters and configure security accordingly (lines 15-26). When a packet is injected into the NoC, it first goes through the security mechanisms depending on what tier is activated (lines 27-29).

Algorithm 1: Main Steps in Security Reconfiguration

```
/* Send security heartbeat periodically*/
  1   if timer > securityHeatBeatPeriod then
  2       send security heartbeat to all SAGs and gather data - D
  3       reconfigureSecurity(D)
  4       restartTimer( )
  5   end
  6   if upon event potentia/Attack == TRUE: then
  7       get data sent by SAG - D; // get data sent by SAG with interrupt
  8       reconfigureSecurity(D)
  9       restartTimer( )
 10   end
/* Major steps of reconfigure security function /
 11   Function reconfigureSecurity(D)
 12       Tn , Pn ← selectSecurityTier(D) // select one from
          T₁, T₂, T₃ and Pₙ
 13       send selected security tier (Tₙ) and parameters (Pₙ) to SAGs
 14       setReconfigurationRegisters(Tₙ, Pₙ)
 15       Tn , Pn ← readReconfigurationRegisters( )
 16       if Tₙ == T₁: then
 17           Q ← encryption(Pₙ)
 18       end
 19       else if Tₙ == T₂: then
 20           Q ← encryption(Pₙ) + authentication(Pₙ)
 21       end
 22       else if Tₙ == T₃ : then
 23           Q ← encryption(Pₙ) + authentication(Pₙ)
 24           monitorDoS(Pₙ)
 25       end
```

Algorithm 1: Main Steps in Security Reconfiguration

```
26     end
/* Send packets in to the NoC*/
27  Function sendPackets(M)
28      send Q(M)
29  end
```

This approach allows easy decoupling of the RSE 502, SAGs 408, security policy, security tiers, and reconfigurable parameters so that each component can be modified independently at design time depending on the system requirements. A list of notations used to illustrate our approach is listed in Table 3 (below).

TABLE 3

| Notation | Description |
|---|---|
| EK (M) | a message M encrypted using the key K |
| A ‖ B | concatenation of two bit strings A and B |
| A ⊕ B | bitwise XOR of two bit strings A and B |
| {q}d | d-bit representation of binary value q (e.g., if d = 4, {1}d = 0001) |
| MSBu (S) | gives the most significant (leftmost) u bits of S |
| len(A) | number of bits in A |
| $0^u$ | string of u zero bits |
| X · Y | multiplication of two elements X, Y ∈ GF ($0^n$) where GF corresponds to a Galois Field. |

Various encryption techniques can be employed and a general overview of various techniques are provided herein. For example, in a symmetric encryption, both encryption and decryption are done using the same key ($\mathcal{K}$). Let ε denote the encryption algorithm. If the message to be encrypted is M, the ciphertext C is produced by taking the key K and a plaintext M as inputs. This is denoted by C← $\mathcal{E}_\mathcal{K}$ (M). Decryption algorithm D performs the inverse operation to recover the plaintext denoted by M← $\mathcal{D}_\mathcal{K}$ (C). Based on input type, encryption algorithms are divided into two categories, Block Ciphers and Stream Ciphers. In block cipher based encryption schemes, the encryption algorithm comprises one or more block ciphers. Formally, a block cipher is a function E that takes a β-bit key K and an n-bit plaintext m and outputs an n-bit long ciphertext c. The values of β and n depend on the design and are fixed for a given block cipher. To encrypt M using block ciphers, M of a given length is divided into n-bit substrings where n is called the block size (n=|m|). Each block cipher encrypts an n-bit plaintext m and concatenates the outputs at the end to create the ciphertext C corresponding to M. The arrangement of block ciphers is defined by the mode of operation used in the encryption scheme. Electronic Code Book (ECB), Cipher Block Chaining (CBC), and Counter Mode (CM) are three common block cipher modes of operation.

To encrypt packets in real-time embedded systems, the encryption scheme can support high-speed encryption with low costs and latency. To achieve this, the operation mode of the encryption scheme can support pipelined and parallelized implementations. Furthermore, due to the nature of packets transferred and routing protocols used in the NoC, some of the packet fields such as addresses, sequence numbers, and ports can be transferred in plaintext. These fields are mainly the header fields of the packet. This can leads to the utilization of an AEAD (Authenticated Encryption with Associated Data) scheme. According to embodiments of the security system, encryption and authentication can be decoupled. Therefore, an authenticated encryption scheme that allows isolation of the two stages can be utilized. Furthermore, the architecture can utilize easy plug-and-play of security primitives that allow for the selection of reconfigurable parameters. To cater to these preferences, the "Counter Mode (CM)" is used in experiments of the present disclosure.

Figure 6:
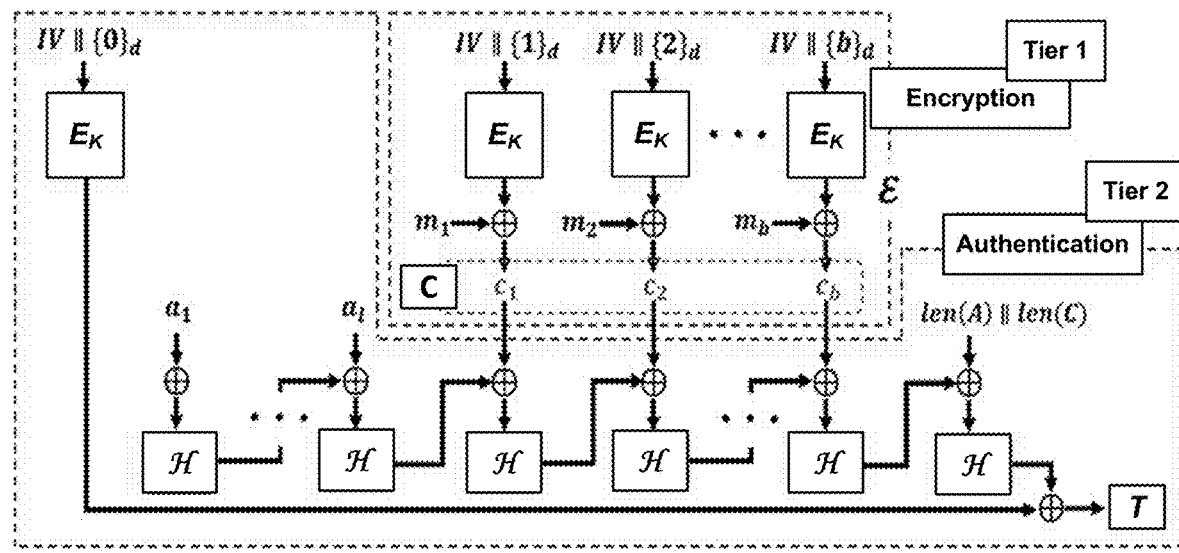
FIG. 6 shows a framework for implementing the decoupling of encryption and authentication in a counter-mode encryption scheme in accordance with embodiments of the present disclosure.

FIG. 6 shows an overview of CM including both encryption and authentication components in NoC in accordance with embodiments of the present disclosure. It is evident from the setup that the framework supports easy decoupling of encryption and authentication allowing activation of encryption only (tier 1), or both encryption and authentication (tier 2) through the values written in RRGs during runtime.

Let $m_1$, $m_2$, . . . , $m_{b-1}$, $m_b^*$ denote a sequence of b bit strings that construct the plaintext. Each bit string in the sequence, also known as a data block, has length n, except for $m_b^*$ with length u where 1≤u≤n. This gives that the total length of plaintext in bits is (b−1)×n+u. The ciphertext associated with this sequence follows the form $c_1$, $c_2$, . . . , $c_{b-1}$, $c_b^*$ where each block is n bits long except for the final block $c_b^*$ which is u bits long.

The encryption algorithm is shown in Algorithm 2 (below). Each blockcipher in CM encrypts the string IV ‖${q}_d$ using a symmetric key K (line 5) where IV refers to the initialization vector which is a nonce (i.e., a nonce is a random string which is distinct for each invocation of the encryption operation for a fixed key). The output $r_q$ of the block cipher is XORed with the plaintext $m_q$ sent to that block (line 6). The final block, which can potentially have less bits (u), is XORed with the most significant u bits of the block cipher output (line 8). The outputs are concatenated to create the ciphertext of length (b−1)×n+u (line 9). The decryption process is the exact inverse. Experiments of the present disclosure utilizes the Galois Counter Mode (GCM) which uses the same setup and AES as the block cipher together with Galoish hash as the hash function. Complete details of GCM can be found in "The Galois/Counter Mode of Operation (GCM)" by David McGrew and John Viega at *Submission to NIST Modes of Operation Process* 20 (2004).

Algorithm 2: Encryption in Counter Mode

```
1   Inputs: plaintext to encrypt M = m₁ ‖ m₂ ‖ . . . ‖ m_b*
2   Output: ciphertext corresponding to the plaintext C
3   Procedure: encryption (parameters P_n = {block cipher EK,
    key K, Initialization Vector IV })
4   for q = 1, . . ., b − 1 do
5       r_q ← E_K (IV ‖ {q}_d )
6       c_q ← r_q ⊕ m_q
7   end
8   c_b* ← m_b* ⊕ MSB_u (E_K (IV ‖ {b}_d ))
9   C ← c₁ ‖ c₂ ‖ . . . ‖ c_b*
10  return C
```

While encryption makes sure that an eavesdropper cannot read the sensitive data, authentication is required to ensure that the adversary does not corrupt/spoof the packets. To address this, a hash-based Message Authentication Code (HMAC) is used. In general, a hash function is a mathematical function that takes a key H and data to be hashed α as inputs and produces a hash digest Δ as the output denoted by Δ← $\mathcal{H}$ (H, α). A typical hash function produces a fixed-length digest irrespective of the size of the input data. Unlike encryption that relies on the ability to "reverse" (decrypt) the encrypted data to produce the plaintext, hashing data makes it extremely difficult to reverse. In fact, the security of a hash function relies on the output being computationally hard to reverse (known as a pre-image resistance) and the hash function being collision resistant.

With HMAC, the receiver is able to verify a message by checking an authentication tag appended to the end of the packet by the source. The receiver can re-compute the original authentication tag and check whether both tags match to see that the message has not been changed during NoC traversal. The tag is computed by using a hash function that takes the message to be authenticated and a key as inputs. In an exemplary approach, since the encrypted data is used as a part of the message to be authenticated, the Encrypt-then-MAC authentication technique is followed, in which the Encrypt-then-MAC is more secure than Encrypt-and-MAC.

In an exemplary AEAD scheme, the associated data was not included in the encryption process. However, associated data (A) should be used when calculating the tag. Similar to M and C, A can also be denoted as a sequence of bit strings $a_1, a_2, \ldots, a_{l-1}, a_1^*$. Each bit string in A has a length of n, except for the last block, $a^*$, with length v, where $1 \leq v \leq n$. It follows that $a_1^*$ can be a partial block and the total length of A in bits is $(l-1) \times n + v$. If $S_q = IV \| \{q\}_d$, the authentication tag (T) can be calculated as:

$$T = MSB_t(\mathcal{H}(H,A,C) \oplus E_K(S_0)) \quad (1)$$

where $|T| = t$ and $\mathcal{H}(H, A, C) = X_{l+b+1}$. The variable $X_i$ for $i=0, 1, \ldots, l+b+1$ is defined as:

$$X_i = \begin{cases} 0 & \text{for } i = 0 \\ (X_{i-1} \oplus a_i) \cdot H & \text{for } i = 1, \ldots, l-1 \\ (X_{l-1} \oplus (a_l^* \| 0^{b-v})) \cdot H & \text{for } i = l \\ (X_{i-1} \oplus c_i) \cdot H & \text{for } i = l+1, \ldots, l+b-1 \\ (X_{l+b-1} \oplus (c_l^* \| 0^{b-u})) \cdot H & \text{for } i = l+b \\ (X_{l+b} \oplus (len(A) \| len(C)) \cdot H & \text{for } i = l+b+1 \end{cases}$$

where $\mathcal{H}$ is the hash function that takes the hash key H as one of the inputs. The t-bit tag is then appended to the packet and injected into the network. Any tampering done to the packet will cause the tag verification at the receiver's end to fail resulting in the packet being discarded and a re-transmission of the packet from the source, which will make sure that the corrupted/spoofed packets will be discarded by NIs before they reach the IPs. The tag calculation method given in Equation 1 is according to the Galois hash function used in experiments of the present disclosure. Other commonly used hash functions for message authentication include SHA-256 and MD5.

Figure 7:
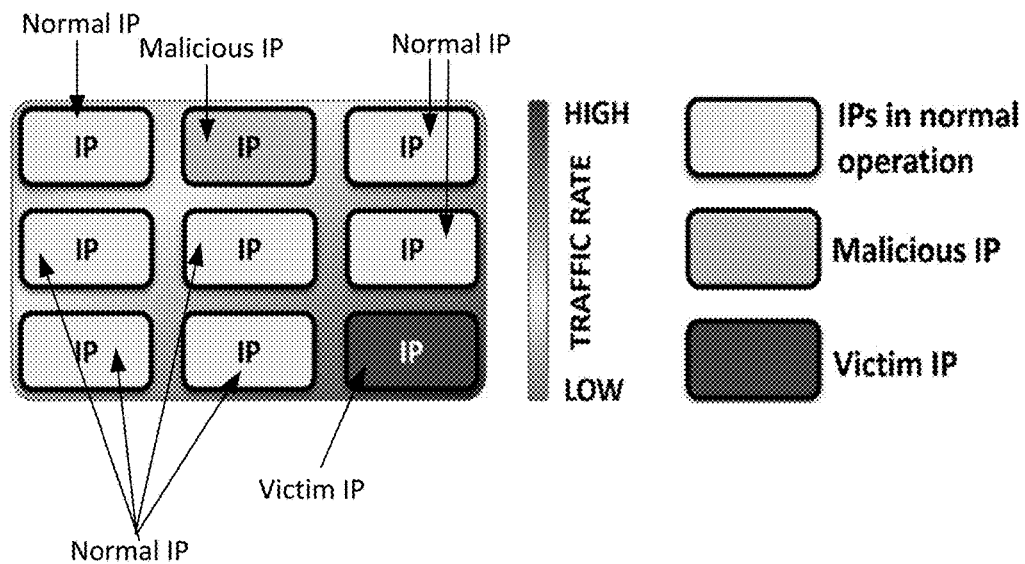
FIG. 7 illustrates an example of a DoS attack in an NoC setup with Mesh topology in accordance with the present disclosure.

FIG. 7 shows an illustrative example of a DoS attack scenario on an NoC. A MIP injects a large amount of traffic to a victim IP causing heavy congestion in links close to the victim IPs. The attack is typically targeted at a critical NoC component such as a memory controller. Due to the congestion, legitimate memory requests from other IPs are severely delayed and the task deadlines can be violated.

To implement the DoS attack detection and localization mechanism, a reconfigurable DoS attack detection and localization algorithm is implemented and integrated with reconfigurable encryption and authentication techniques in accordance with embodiments of the present disclosure. The basic idea is to statistically analyze network traffic and to model communication patterns. Using the model, two curves are obtained that capture system characteristics: (i) upper bounds of packet arrival curves (PAC) are calculated at each router, and (ii) destination packet latency curves (DLC) are constructed at each IP. PAC bounds are used to detect DoS attacks, and once an attack is detected, DLCs are used to localize the MIP.

An overview of this approach together with the parameters passed from an exemplary reconfigurable architecture is shown in Algorithm 3 (below). The detection and localization mechanisms are implemented in such a way that localization can be disabled without affecting the detection mechanism. This is defined by the DoSTier parameter. In that case, an ongoing attack will be detected, but the MIP will not be localized. While this approach gives better performance and energy efficiency, the MIP can launch the attack again, unless it is diagnosed separately. Similarly, to achieve improved energy efficiency, the detection mechanism at the routers can sleep periodically. The sleep time is defined by the detectionInterval parameter. In such a scenario, energy efficiency will improve while compromising with delays in DoS attack detection. An SoC running tasks with soft-deadlines can afford to have a DoS attack detection mechanism that is not always active. However, if there are tasks with hard-deadlines, it is better to detect immediately (i.e., no sleeping) to avoid delays caused by DoS attacks.

---

Algorithm 3: DoS Attack Detection and Localization Mechanism

1 Procedure: monitorDoS (parameters $P_n$ = {DoSTier, detectionInterval})
2 if DoSTier == detectOnly then
3    detectDoS(detectionInterval); // start packet monitoring at routers and check for PAC bound violations
4 end
5 if DoSTier == detectAndLocalize then
6    detectDoS(detectionInterval); // start packet monitoring at routers and check for PAC bound violations
7    localizeDoS( ); // if a potential attack is detected, initiate localization mechanism to pinpoint the MIP
8 end

---

The reconfigurable parameters in encryption and authentication are self-explanatory and have been discussed in "Reconfigurable Cryptography: A Flexible Approach to Long-Term Security" by Julia Hesse, Dennis Hofheinz, and Andy Rupp at *Theory of Cryptography Conference*, Springer (2016), pp. 416-445; "Implementation of an Energy Efficient Reconfigurable Authentication Unit for Software Radio" by L. Thulasimani and M. Madheswaran at *International Journal on Computer Science and Engineering* Vol. 2, No. 04 (2010), pp. 1375-1380; and "Dynamically Reconfigurable Encryption and Decryption System Design for the Internet of Things Information Security" by Zhu Wang, Yan Yao, Xiaojun Tong, Qinghua Luo, and Xiangyu Chen at *Sensors* 19(1): 143 (2019). Tier 3 allows decoupling of DoS attack detection and localization. If detection only is selected, the SoC will detect an ongoing DoS attack, but not localize the malicious IP, whereas the other option enables both detection as well as localization. The detection interval defines the duration, in which the detection mechanism is active. As such, the detection mechanism can be always active leading to quick detection of DoS attacks or can be periodically active to save power.

Figure 8:
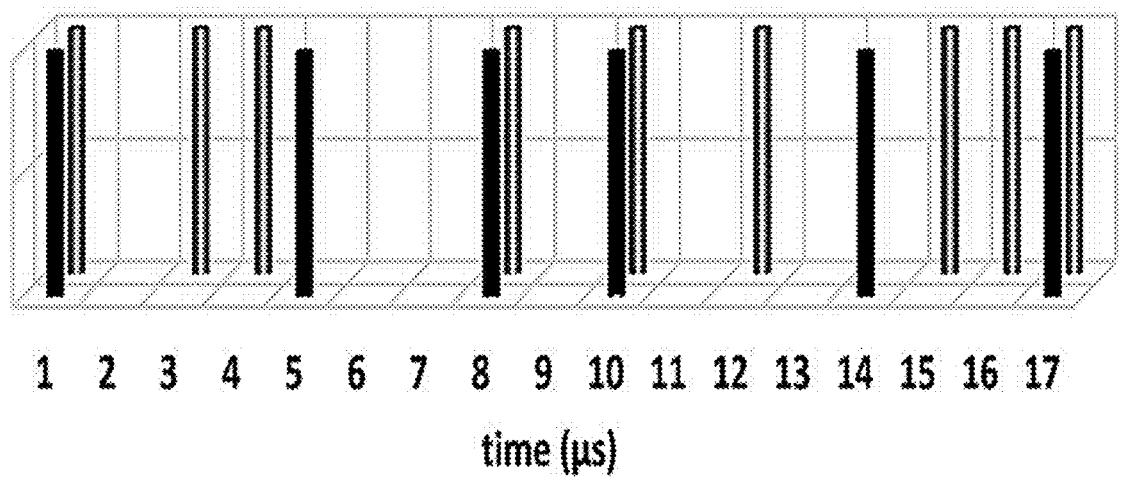
FIG. 8 is a graph showing two sample event traces where the solid trace shows packet arrivals at a router under normal operation ($P_r$) and the outlined trace shows packet arrivals in the presence of a DoS attack ($\tilde{P}_r$).

For an exemplary DoS attack detection using PAC bounds, upon arriving at a router (r), a packet is seen as an event and can be recorded with arrival curves. The packet stream ($P_r$) comprises of all of the packets that arrive at r during the execution of a particular program. FIG. 8 illustrates comparison of two different packet streams, one normal and one compromised, over the time interval. $P_r$ (solid) shows the normal stream of packet arrivals, and $\tilde{P}_r$ (outline) shows a compromised stream with an influx in packets over the same time. For some half-closed interval, [$t_a$, $t_b$), the total number of packets passing through r is called the packet count ($N_{P_r}[t_a, t_b]$) which is defined in Equation 2. The parameters used to calculate $N_{P_r}[t_a, t_b)$ are $N_{P_r}(t_a)$ and $N_{P_r}(t_b)$, which are the maximum number of packets before time $t_a$ and time $t_b$, respectively.

$$\forall t_a, t_b \in \mathbb{R}^+, t_a < t_b, n \in N: N_{P_r}[t_a, t_b) = N_{P_r}(t_b) - N_{P_r}(t_a) \quad (2)$$

Then, the upper PAC bound ($\lambda_{P_r}^u(\Delta)$) is constructed for every router from the previously collected packet arrival data. In order to construct an upper bound, the maximum number of arrivals is necessary for any time interval $\Delta(=t_b-t_a)$. Equation 3 defines how this is computed by sliding a window of length $\Delta$ over $P_r$ to calculate the maximum number of packets arrivals within that window.

$$\lambda_{P_r}^u(\Delta) = \max_{t \geq 0} \{N_{P_r}(t + \Delta) - N_{P_r}(t)\} \quad (3)$$

Figure 9:
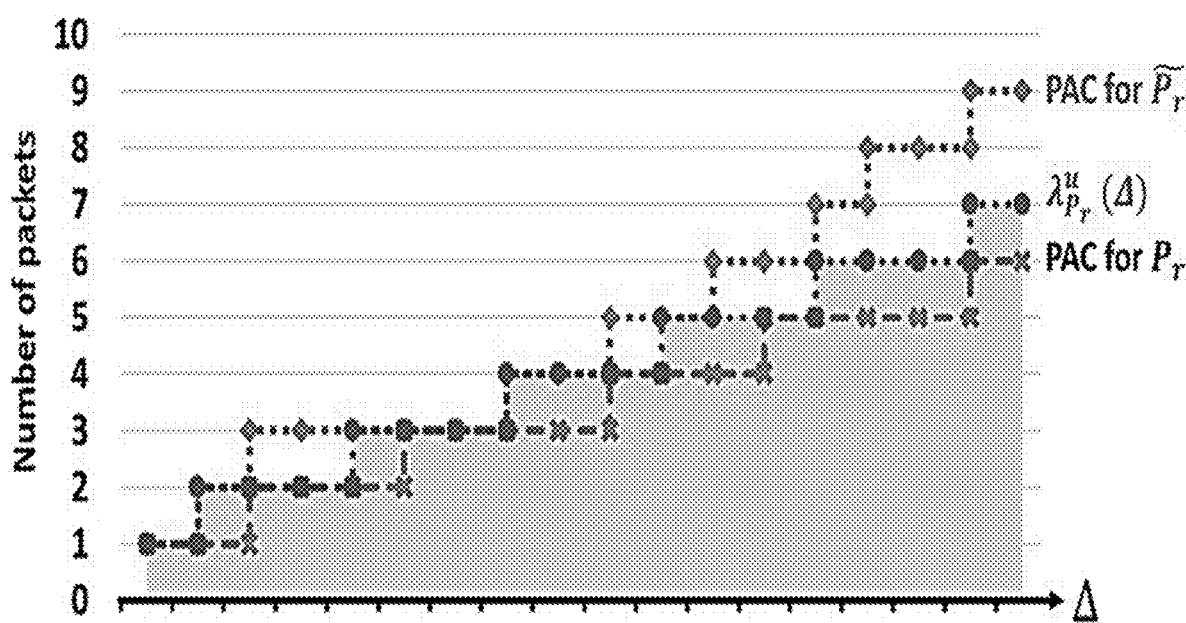
FIG. 9 is a graph showing an upper bound of packet arrival curves (PACs) under normal operation ($P_r$) and in the presence of a DoS attack ($\tilde{P}_r$).

The process is repeated for several fixed $\Delta$ to construct the upper PAC bound. Once the upper PAC bound is constructed, it can be used in detecting abnormal behaviors in real time by the Leaky Bucket Algorithm. FIG. 9 shows a PAC bound and two PACs corresponding to $P_r$ and $\tilde{P}_r$ from FIG. 8. It illustrates how $\tilde{P}_r$, the compromised stream, goes beyond the shaded region indicating there is a DoS attack happening.

Figure 10A:
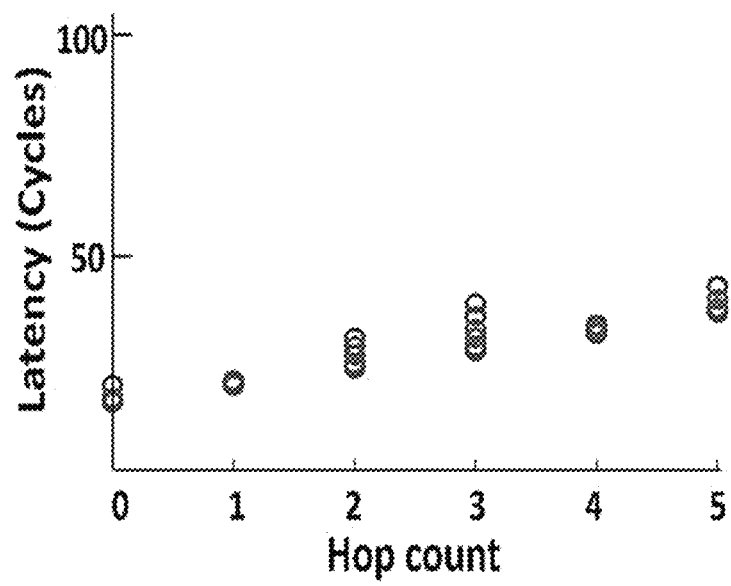
FIGS. 10A-10B show destination packet latency curves (DLC) constructed at an intellectual property (IP) core under normal operations and under a DoS attack scenario.
Figure 10B:
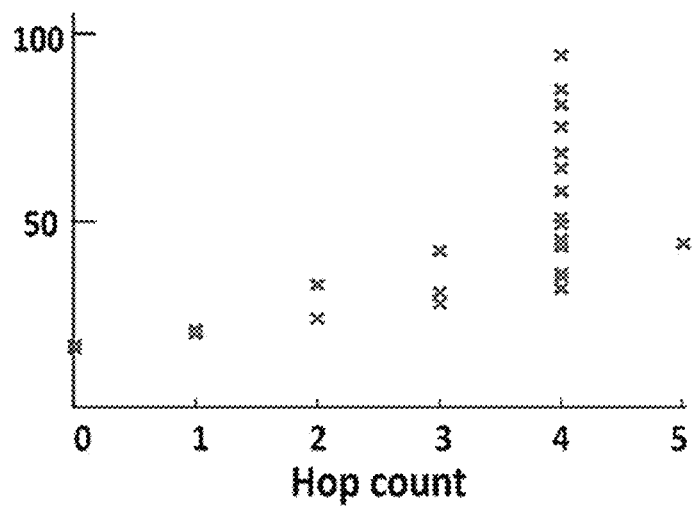

For an exemplary DoS Attack Localization, DLCs are used in addition to PAC bounds. While every router along the path constructs PACs, every destination IP constructs a DLC. FIGS. 10A-10B show two examples of DLCs with FIG. 10A being normal operation and FIG. 10B corresponding to an attack scenario. The DLCs capture the latency of a packet (y-axis) from source to destination $D_i$ against the number of hops traversed by the packet from source to destination (x-axis). The distribution of latencies against each hop count follows the normal distribution, which is represented by its mean and variance. The mean and variance of the latency distribution of packets travelling k hops to reach $D_i$ are denoted by $\mu_{i,k}$ and $\sigma_{i,k}$, respectively. The packet header holds the source and hop count information that the destination will extract for profiling. From the packet header information, the destination constructs a graph capturing the latency of packets from source to destination against the number of hops. Mean and variance for the distribution at each hop count is calculated after every packet has arrived.

Should a violation be flagged during the detection phase, the local IP attached to that router initiates the diagnosis. By referring to its DLC, the local IP finds the packets that have suspicious (longer than usual) latencies using the parameterized $\mu_{i,k}$ and $\sigma_{i,k}$ values. The local IP then uses the source address of the delayed packets to get congestion data from the other routers in that path. From there, the MIP is localized by the local IP. For example, one can only conclude that the source address of the delayed packets is a candidate MIP. Concluding that the source address of the delayed packets is where the attack is originating from can lead to many false positives. An exemplary method relies on the victim pinpointing the attacker and other IPs removing the false positives. The behavior of each router during DoS attack localization is given in Algorithm 4 (below).

```
Algorithm 4: localizeDoS( ): Event handlers for routers 1  upon event attacked == TRUE:
 2    send a signal to local IP
 3  upon receiving address of the candidate MIP S from local IP:
 4    send a query to the router of S for its congestion status
 5    if S is congested then
 6      send a diagnostic message < S,D > to all routers in the path
        from S to D indicating that S is the potential attacker
 7    end
 8  upon receiving a diagnostic message < S,D > from port pi:
 9    start TIMEOUT if all flag == 0
10    if S is local IP and flag [pi] == 0 then
11      flag [pi] = 1 // local IP is the MIP
12    end
13    if S is not local IP then
14      flag [pi] = 2 // local IP is not the MIP
15    end
16  upon event TIMEOUT:
17    if flag contains 1 then
18      broadcasting that its local IP is the attacker
19      RESET
20    end
21  upon event RESET:
22    flag [pi] = 0 for all ports pi
```

Figure 11:
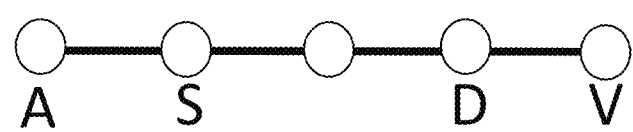
FIG. 11 shows an illustrative example with local IP (D), attacker IP (A), victim IP (V), and the candidate MIP (S) as found by D.
Figure 12:
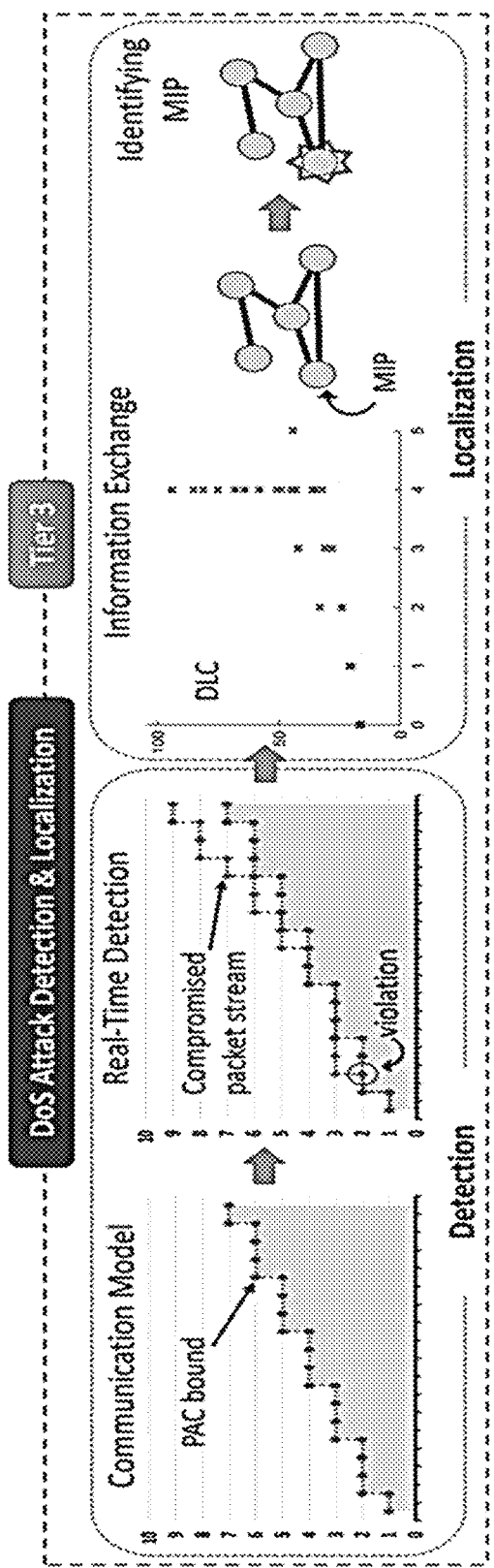
FIG. 12 shows an overview of the DoS attack detection and localization framework using PAC bounds and DLCs in accordance with embodiments of the present disclosure.

The behavior of the algorithm can be explained using FIG. 11. The attacker IP, A, launches a DoS attack at V and two other IPs, S and D, are located along the same congested path. Routers of D and V both will flag a potential attack (lines 1-2) and check the DLC for candidate MIPs. Even though S and D are not the attacker or the victim, packets originating from S with destination D will be delayed since they are on the congested path. Therefore, the router of S will be flagged as a candidate MIP by D (lines 3-7). As a result, the router of S will receive a message from the router of D indicating that its local IP is the attacker, which will cause the flag to be set to 1 (lines 8-12). However, S will receive another message from V, since S is on the path from V to A, indicating that A is the potential attacker. This will cause the flag at S to be changed to 2 (lines 13-15). The router of A will only receive the message from V which will cause the flag to remain at 1. When the timeout occurs, flag at S is set to 2, and therefore, no action is taken. However, the router of A has a flag set to 1, and therefore, a broadcast is sent indicating that A is the attacker (lines 16-20). The overview of both DoS attack detection and localization is shown in FIG. 12. The attack detection phase occurs first and is shown in the left part of the figure. The localization of the MIP occurs after detection as shown in the right part of the figure. The complete methodology is explained by Charles et al. in "Real-time Detection and Localization of DoS Attacks in NoC based SoCs." See Subodha Charles, Yangdi Lyu, and Prabhat Mishra, "Real-time Detection and Localization of DoS Attacks in NoC Based SoCs," in 2019 *Design, Automation & Test in Europe Conference & Exhibition* (March 2019), IEEE, pp. 1160-1165. Unlike the work done by Charles et al., the service NoC is used to pass messages between IPs when localizing the MIP which will reduce the localization time.

An experimental setup was built using the gem5 cycle-accurate full-system simulator. An 8×8 Mesh NoC-based SoC was modeled with 64 IPs. GARNET2.0 detailed on-chip interconnection network model was used for the NoC after modifying the default garnet model to include exemplary reconfigurable security architecture. The delay for encryption/decryption and authentication was assumed to be 12 cycles. GARNET2.0 uses the routing infrastructure provided by gem5's ruby memory system model. The number of pipeline stages in the router was set to be 3 and each link is assumed to consume 1 cycle to transfer a packet between neighboring routers. Each message from an IP goes through the security operations implemented at the NI and is then divided into flits (flow control units) before being injected into the NoC through its local router. The NoC then routes the packet depending on the routing protocol (XY routing in the experimental setup) and the NI at the destination performs decryption and tag validation before sending the message to the destination IP. The output statistics of the gem5 simulation were fed to the McPAT power modeling framework to obtain power consumption.

The system was tested using 4 real benchmarks (FFT, RADIX, FMM, LU) from the SPLASH-2 benchmark suite and 6 synthetic traffic patterns (uniform random (URD), tornado (TRD), bit complement (BCT), bit reverse (BRS), bit rotation (BRT), transpose (TPS)). When running both real benchmarks and synthetic traffic patterns, each IP in the top (first) row of the Mesh NoC instantiated an instance of the task. Real benchmarks used 8 memory controllers that provide the interface to off-chip memory which were connected to the bottom eight IPs. As synthetic traffic patterns do not use memory controllers, the destination of injected packets were selected based on the traffic pattern. For example, uniform random selected the destination from the 8 IPs at the bottom row with equal probability. Source and destination modeling was done in this manner to mimic the secure and non-secure zones. When simulating DoS attacks, a MIP that is randomly placed in the middle rows (non-secure zone) injected more packets into the NoC targeted at one of the destination IPs, which receive high traffic from legitimate requests. According to an exemplary architecture model, the IPs in the top row (secure zone) communicate with the IPs in the bottom row (secure zone) through the other 6 rows (non-secure zone) of IPs. An exemplary approach will work the same for any other secure, non-secure zone selection and MIP placement. Table 4 (below) shows the identification of reconfigurable parameters selected in our experiments.

TABLE 4

| Security Primitive | Reconfigurable Parameters |
| --- | --- |
| Encryption (Tier 1) | AES Blockcipher, 128-bit key, 128-bit block, 96-bit IV |
| Authentication (Tier 2) | Galois Hash, 128-bit key, 128-bit input |
| DoS attack detection and localization (Tier 3) | Detection and localization both active, Detection always active without sleeping |

Figure 13A:
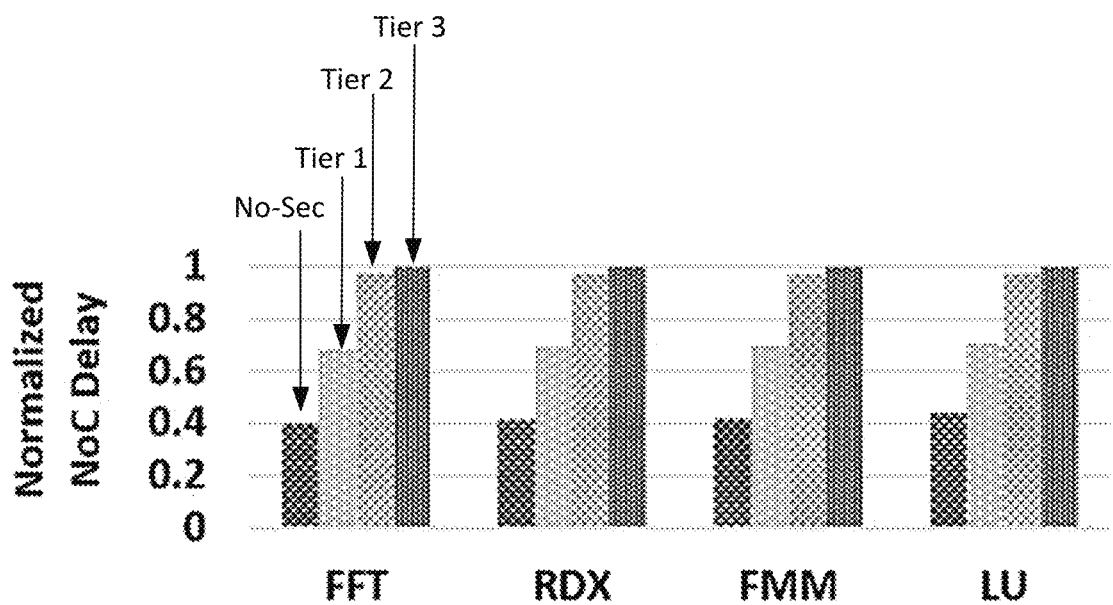
FIGS. 13A-13B show NoC delay and execution time comparisons across different security tiers in accordance with the present disclosure
Figure 13B:
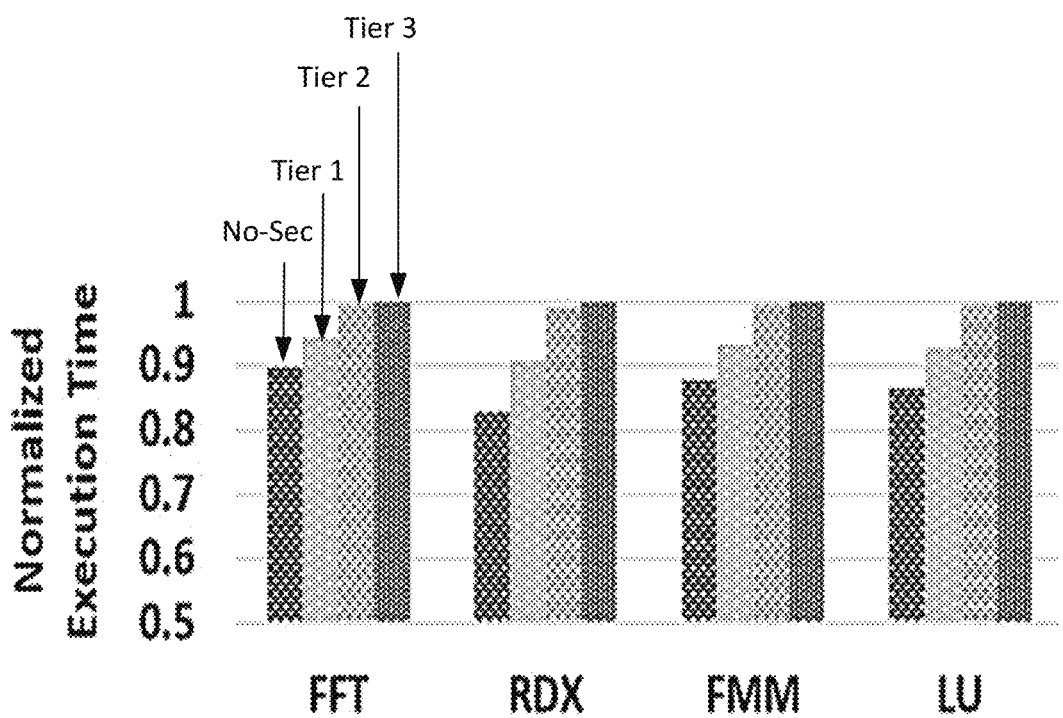

These choices were motivated by the capabilities of the simulator as well as the lightweight nature of IoT and embedded devices. The components of an exemplary security scheme was implemented using Verilog to show the area overhead. Experiments were conducted using Synopsys Design Compiler with 90 nm Synopsis library (saed90 nm). To evaluate the execution time for each application, the setup was simulated with different security levels. FIGS. 13A-13B and Table 5 (below) show results for four levels of security when running real benchmarks.

No-Sec—NoC without implementing any security.
Tier 1—Tier 1 security implemented. Encryption only.
Tier 2—Tier 2 security implemented. Encryption and authentication
Tier 3—Tier 3 security implemented. Encryption, authentication and DoS attack detection & localization.

TABLE 5

| | FFT | RDX | FMM | LU |
| --- | --- | --- | --- | --- |
| No-Sec | 3.444E+08 | 2.419E+10 | 8.807E+09 | 3.684E+09 |
| Tier 1 | 3.638E+08 | 2.669E+10 | 9.422E+09 | 3.968E+09 |
| Tier 2 | 3.833E+08 | 2.918E+10 | 1.004E+10 | 4.251E+09 |
| Tier 3 | 3.849E+08 | 2.939E+10 | 1.009E+10 | 4.275E+09 |

FIG. 13A shows NoC delay (end-to-end NoC traversal delay) of different security tiers. Compared to No-Sec, 40%, 57%, and 58% more delay is observed on average across all benchmarks in Tier 1, Tier 2, and Tier 3, respectively. Execution time is compared in FIG. 13B and it shows a similar trend. Tier 1, Tier 2, and Tier 3 take 7%, 12.7%, and 13.2% more time to execute each simulation, respectively. The impact of security features is less in total execution time since it includes instruction execution, memory operations, etc., in addition to NoC traversal delay. Difference between performance in Tier 2 and Tier 3 is very small (0.5% in execution time), since the DoS attack detection mechanism can run in parallel to normal router computations once separate hardware is implemented. Charles et al. in "Real-time Detection and Localization of DoS Attacks in NoC Based SoCs" reported that there is no performance overhead in their 5-stage router pipeline. However, since a 3-stage router pipeline was implemented which makes the normal router computations to take place faster, DoS attack detection can take a bit longer depending on crossbar contention at that time, and therefore, a slight delay was observed.

Figure 14:
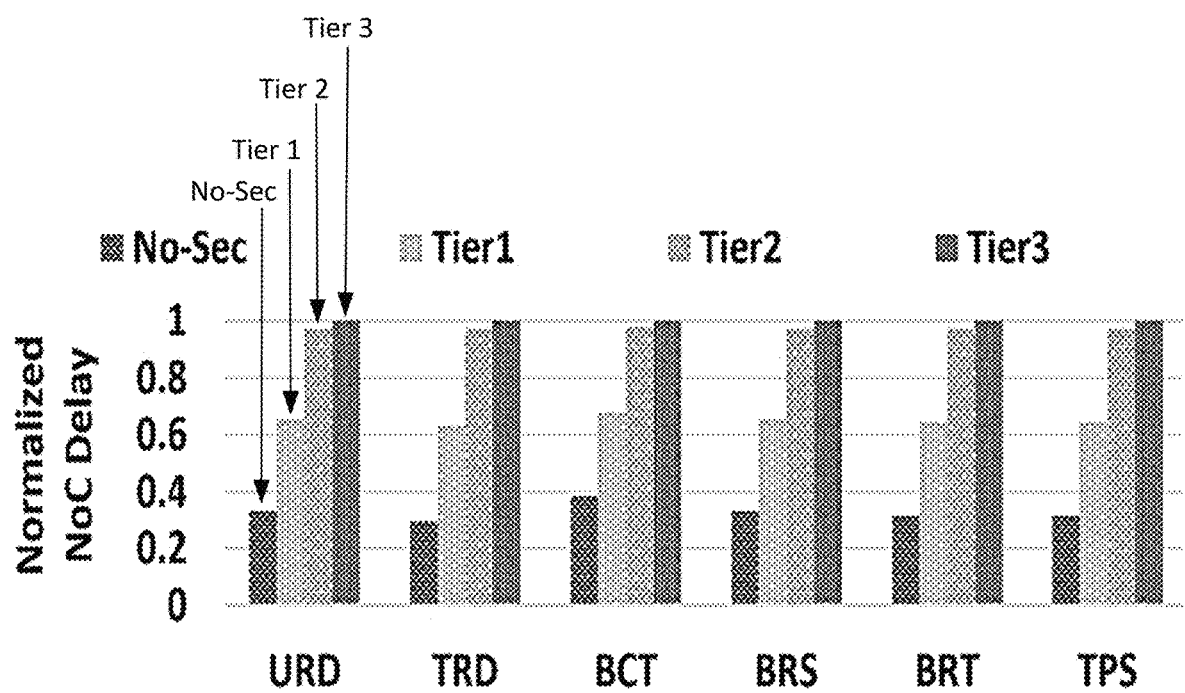
FIG. 14 shows NoC delay comparisons across different security tiers when running synthetic traffic patterns in accordance with the present disclosure.

The same experiments were run on synthetic traffic patterns and results are shown in FIG. 14. NoC delay can only be captured when running synthetic traffic patterns, since running synthetic traffic patterns does not include instruction execution and memory operations. 50%, 66% and 67% more NoC delay on average were observed in Tier 1, Tier 2 and Tier 3, respectively, when compared with No-Sec. Both FIGS. 13A-13B and 14 show us that added security comes at the expense of performance. Therefore, the security level can be reconfigured depending on the use-case scenario.

To evaluate area overhead in comparison with the NoC that does not implement any security (No-Sec), security tiers were implemented using Verilog. The RTL of an open-source NoC architecture was modified and experiments were conducted using a Synopsys Design Compiler with 90 nm Synopsis library (saed90 nm). Results are shown in Table 6 (below).

TABLE 6

| | Tier 1 | Tier 2 | Tier 3 | Tier 1 (Overhead) | Tier 2 (Overhead) | Tier 3 (Overhead) |
| --- | --- | --- | --- | --- | --- | --- |
| Area | 609696 µm² | 618473 µm² | 620228 µm² | 4.2% | 5.7% | 6% |

Area overhead was calculated for each security tier. For example, area overhead for Tier 2 includes overhead introduced by encryption as well as authentication hardware. Since our proposed framework requires all the features to be integrated so that the RSE can select which tier to activate, the total area overhead is the overhead to implement Tier 3 security, which is 6%. If a certain SoC designer decides to only integrate features in Tier 1 (encryption), overhead would be 4.2%. If Tier 3 is implemented, in addition to the additional hardware required at routers and NIs, each IP stores and processes the DLCs. The result of $\mu_{i,k}+1.96\,\sigma_{i,k}$ is calculated and stored for each hop count in the DLC as a 4-byte integer. This aggregates to a total memory space of 1×m×4 parameters to store the DLC, where m is the maximum hop count between two IPs in the NoC. It is safe to assume that this additional memory space is negligible, since the IPs typically have much more bandwidth than any other NoC component.

The power overhead is introduced by the additional computations required to implement the reconfigurable security architecture. Compared to No-Sec, each packet injected into the network will have to go through encryption when Tier 1 is enabled. At the destination, the inverse process—decryption takes place. These processes consume extra power. Tier 2 consumes extra power for the tag computation and validation part and Tier 3 consumes extra power for constructing DLCs at each IP and monitoring DoS attacks at each router. The gem5 output statistics were fed into the McPAT power modeling framework to obtain power consumption. The NoC power model in McPAT was modified according to the work done by Ogras et al. See Umit Y. Ogras and Radu Marculescu, "Modeling, Analysis and Optimization of Network-On-Chip Communication Architectures," Springer Science & Business Media, Vol. 184 (2013). Power consumption when running the four real benchmarks (FFT, RADIX, FMM, LU) were recorded and average power consumption was compared in Table 7 (below) together with power overhead introduced by each security tier. Tier 1 has a power overhead of 3.2%, which consists of overhead for encryption. Note that each tier includes capabilities of the tier below. In other words, 4.8% power overhead in Tier 2 includes both encryption (3.2% in Tier 1) and authentication (1.6%) power overhead. Similarly, Tier 3 consumes 7.9% power overhead, which includes the 4.8% overhead for Tier 2 and an additional 3.1% for DoS detection and localization. The results are consistent with the previous studies on lightweight NoC encryption done by Sepúlveda et al. See Johanna Sepúlveda, Andreas Zankl, Daniel Flórez, and Georg Sigl. "Towards Protected MPSoC Communication For Information Protection Against A Malicious NOC," Procedia Computer Science 108 (2017), pp. 1103-1112.

memory, communication with I/O devices, and user-level scalar operand and stream communication between tiles.

The trade-off here is performance versus area. When many different types of packets are used in the NoC, the packet must contain data to distinguish between those types. Existing buffer space has to be shared between packet types. Both these concerns add performance overhead and when scaling up to 64 IPs, the overhead becomes significant. On the other hand, contrary to intuition, additional wiring between nodes incur minimal overhead as long as the wires stay on-chip due to the advancements in fabrication processes. Furthermore, the more expensive and scarce commodity is the on-chip buffer area compared to wiring bandwidth. If virtual channels are used for different types of packets and buffer space is shared, the increased buffer spaces and logic complexity will equal to that of another physical network. Yoon et al.'s work provides a comprehensive analysis about the trade-offs between having virtual channels and several physical NoCs. See Young Jin Yoon, Nicola Concer, Michele Petracca, and Luca P Carloni, "Virtual Channels and Multiple Physical Networks: Two Alternatives To Improve NoC Performance," IEEE Transactions on Computer-Aided Design of Integrated Circuits and Systems 32,12 (2013), pp. 1906-1919. Using their analysis that fits the NoC parameters we have chosen, the area and power overhead of having two physical NoCs compared to one NoC are 6% and 7%, respectively.

The RSE is a dedicated IP on the SoC that decides the security tier to be used based on the security policies. The policy engine can be implemented as a finite state machine (FSM) where the security tiers are the states and state transitions happen depending on the policies. In one embodiment, the RSE decides which security tier and parameters to activate based on battery level and NoC congestion information. The implementation of such a finite state machine incurs negligible area and power overhead.

It is worthwhile discussing what happens to the in-flight packets on the NoC during a security tier change. When changing from Tier 1 to Tier 2, the transition forces an authentication tag to be included in the NoC packets. However, the in-flight packets when the transition happens does not contain an authentication tag since they were injected when the architecture was in Tier 1. Therefore, any packet that does not contain an authentication tag will be dropped. Since security is not expected to be reconfigured frequently,

TABLE 7

| | Tier 1 | Tier 2 | Tier 3 | Tier 1 (Overhead) | Tier 2 (Overhead) | Tier 3 (Overhead) |
|---|---|---|---|---|---|---|
| Power | 5304 mW | 5387 mW | 5546 mW | 3.2% | 4.8% | 7.9% |

A service NoC of an exemplary architecture of the present disclosure is responsible for transferring packets intended for DoS attack localization, communication between SAGs and RSE, and key distribution for encryption and authentication. In various embodiments, the feature of using a separate NoC instead of using one NoC for all purposes was inspired by state-of-the-art commercial SoCs that implement multiple physical NoCs to carry different types of packets. For example, the Intel Knights Landing (KNL) architecture features four parallel NoCs and has been widely deployed in the Intel Xeon processor family. The Tilera TILE64 architecture comprises of five parallel 2D Mesh NoCs, each used for a different purposes such as communication with main the performance overhead due to the dropped packets is negligible. In fact, security reconfiguration is expected to be less frequent compared to traditional reconfiguration techniques, such as dynamic voltage scaling (DVS) or dynamic cache reconfiguration (DCR). In DCR or DVS, the reconfiguration frequency depends on the length of a phase in a task, which is in the order of milliseconds or seconds. In various embodiments, it is envisioned that security reconfiguration frequency will be in the order of minutes of even hours. To quantify the performance overhead for dropping packets, the maximum number of in-flight packets at any given time were profiled when Tier 1 is active. Table 8 (below) shows the results as a comparison of total number of packets injected when running each benchmark.

TABLE 8

|  | FFT | RDX | FMM | LU |
|---|---|---|---|---|
| Total number of packet injected | 809,632 | 103,987,824 | 25,629,248 | 11,820,880 |
| Maximum number of packets in Flight at any given time | 532 | 569 | 585 | 630 |
| Max number of packets as a percentage of total number of packets | 0.0657% | 0.0005% | 0.0023% | 0.0053% |

Dropping packets will not affect the accuracy of operation, since the IPs which injected the dropped packets will re-transmit the requests after not receiving a response. Such re-transmission mechanisms are already in place for NoC error correction protocols. Note that packet dropping is not required when transitioning from Tier 2 to Tier 3 (or vice versa) due to the nature of the DoS attack detection mechanism.

Concerning security guarantees, since Tier 1 implements encryption only, the secrecy of packets is ensured while the integrity of packets is not. An eavesdropper on the NoC will be unable to read the critical data in a packet unless it manages to break the cipher. The security of the cipher depends on the security of the operation mode, counter mode in this case, as well as the block cipher. Each block in the counter mode is treated independently while encrypting. In such a setup, using the same $IV\|\{q\}_d$ string with the same key K can cause the "two time pad" situation. In an exemplary method, using a nonce as the IV for each encryption addresses this situation. Further security can be ensured by setting the string to $IV\|seq_j\|q$ where q corresponds to the block cipher ID and $seq_j$ represents the sequence number of the $j^{th}$ packet, which gives per message and per block variability and ensures that the value is a nonce. The use of $IV\|seq_j\|q$ string allows reusing the IV and it can be reset after a certain number of encryptions. GCM uses AES as its block cipher, in which AES has been shown to be resistant against all known cryptographic attacks and is yet to be broken Tier 2 adds another layer of security on top of encryption by enabling authentication, which addresses the issue of data integrity. The authentication tag validation relies on the fact that unless the hash key is known, no other key and input string combination should produce the same hash digest. If this condition fails, an adversary will be able to alter the packet content, re-generate a tag for that string and replace the existing tag with it. Then, the corrupted packet will be validated as a legitimate packet. To ensure this does not happen, the chosen hash function has to be collision resistant. Our choice of hash function—Galois hash—adheres to this criteria and is also pre-image and secondary pre-image resistant.

Figure 15:
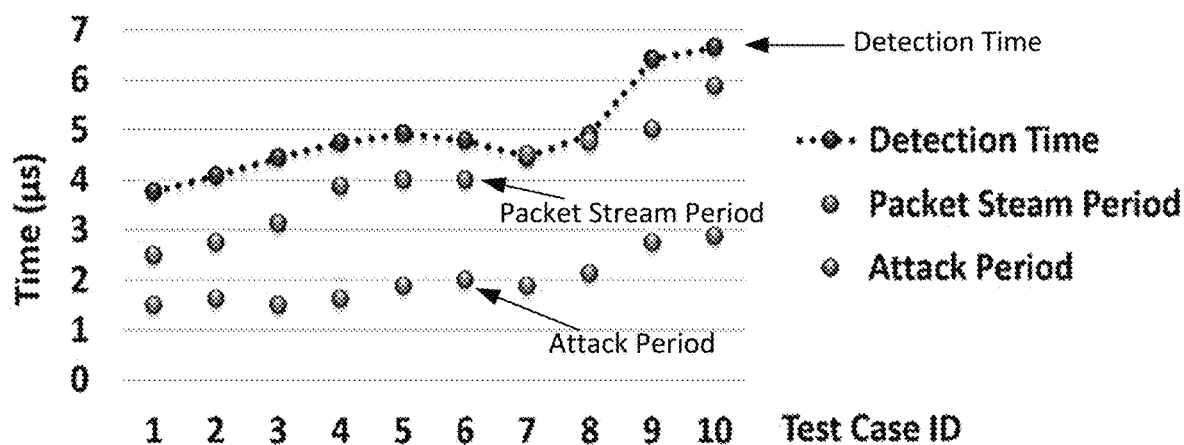
FIG. 15 shows a comparison of DoS attack detection time when running synthetic traffic patterns in accordance with the present disclosure.

Tier 3 contributes the last layer of security of our framework, DoS attack detection & localization. To evaluate the efficiency of the approach, simulations were executed in the presence of one MIP placed at random in the middle rows (non-secure zone). The MIP injected more packets into the NoC targeted at one of the destination IPs. The packet stream periods and attack periods were selected at random. Packet steam periods were assigned a value between 2 and 6 μs at random and attack periods were assigned a random value between 10% and 80% of the packet stream period. Experiments were conducted using the six synthetic traffic patterns and random placements of MIP launching the DoS attack. Out of the collected traces, 10 of them were selected such that the test cases include all synthetic patterns and applicable MIP placements. FIG. 15 shows the detection time for 10 test cases running synthetic traffic patterns. To simulate the DoS attack, the packet stream periods and attack periods were selected at random. Packet steam periods were assigned a value between 2 and 6 μs at random and attack periods were assigned a random value between 10% and 80% of the packet stream period. The results show that the detection time depends on the attack period and is approximately twice the attack period, which confirms that DoS attack detection can be done in real-time.

Figure 16:
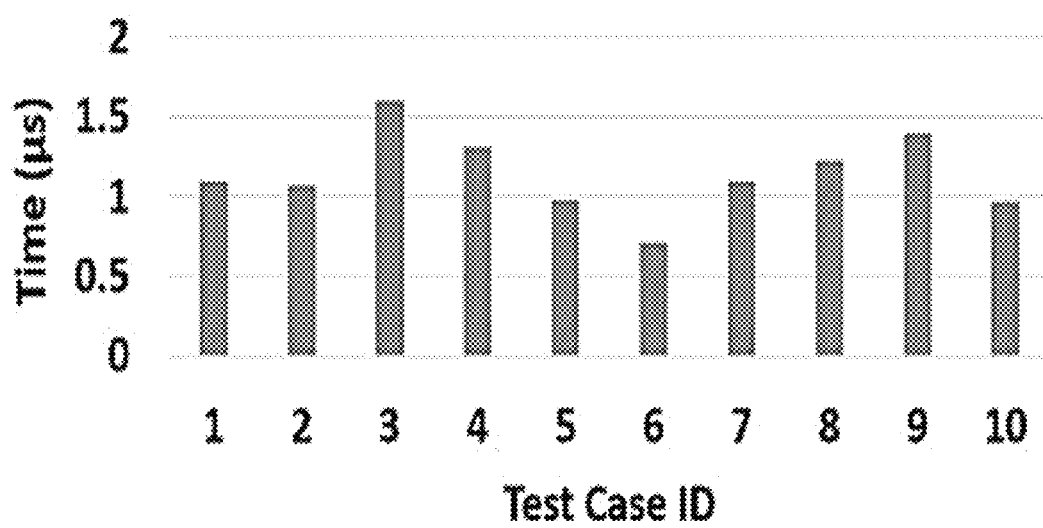
FIG. 16 shows DoS attack localization time when running synthetic traffic patterns in accordance with the present disclosure.

The final step of Tier 3, DoS attack localization, can be done in real-time as well, as shown in FIG. 16. The efficiency of DoS attack localization was evaluated by measuring the time between detecting the attack and localizing the malicious IP. FIG. 16 shows the results of experiments using the same ten test cases running synthetic traffic patterns. The results are consistent with the work done by Charles et al. in "Real-time Detection and Localization of DoS Attacks in NoC based SoCs." Charles et al. has shown that the framework is capable of detecting and localizing DoS attacks across different topologies and deterministic routing protocols. Therefore, it is well-suited for real-time IoT applications.

Many embedded systems and IoT devices have a long application life. This coupled with the fact that it is hard to predict future security threats to a device designed or deployed today, these devices need to have support for dynamic security reconfiguration. The present disclosure presents a reconfigurable security architecture that can select security tiers and configure parameters in each security tier based on system requirements. While illustrative examples are provided for a tier-based reconfigurable security architecture using a three-tier architecture that incorporated encryption, authentication, and DoS attack detection and localization, the exemplary tier-based reconfigurable security architecture can be easily extended to any number of security tiers depending on the security requirements, available security primitives, and/or design constraints.

Further, in accordance with various embodiments of the present disclosure, an exemplary tier-based reconfigurable security architecture can be built on top of an FPGA based reconfigurable fabric, where the implementation of each of the security primitives as well as the security tiers can be dynamically adapted at runtime. For example, an AES encryption module can be replaced with a new encryption algorithm while maintaining the expected execution behavior of the overall system. Similarly, a new security solution can be added in an existing security tier or as a new security tier using our reconfigurable security architecture. Thus, embodiments of the present disclosure can provide an adaptive future-proof solution that allows implementation of new security solutions on a deployed device.

Similar to reconfigurable security in the software and firmware level, the present disclosure presents embodiments of a reconfigurable security architecture in hardware that can be tailored during execution based on the interoperability constraints of power, performance, and area. The idea of reconfigurable security has been well studied in the software level. Early operating systems such as Multics implemented Mandatory Access Control schemes. However, modern commercial operating systems such as Windows and Unix implement Discretionary Access Control systems give more control to the user to change access control depending on the requirements at the expense of security. The kernel that is considered as the most-secure among commercially available operating systems is Security-Enhanced Linux (SE-Linux) implements Linux Security Modules which gives the capability to change security policies through security hooks and a policy engine. Hardware security reconfiguration has been discussed in different contexts. Hsu et al. proposed a reconfigurable security architecture based on edge-computing for IoT networks in "Reconfigurable Security: Edge-Computing-Based Framework for IoT" at *IEEE Network*, Vol. 32, No. 5 (2018), pp. 92-99. Here, the authors discussed how to interface multiple protocols (Bluetooth, ZigBee etc.) together without changing functionality of the upper layers of a layered communication architecture. Wang et al. proposed a reconfigurable encryption/decryption architecture that supported multiple cryptographic algorithms and allowed dynamic selection of algorithms depending on the requirements in "Dynamically Reconfigurable Encryption and Decryption System Design for the Internet of Things Information Security" at *Sensors* Vol. 19, No. 1 (2019), p. 143. Two reconfigurable encryption schemes and a reconfigurable signature scheme were proposed in "Reconfigurable Cryptography: A Flexible Approach to Long-Term Security" by Julia Hesse, Dennis Hofheinz, and Andy Rupp at *Theory of Cryptography Conference*, Springer (2016), pp. 416-445. Their work relied on using a "common reference string" (CRS) to derive "short-term" keys from "long-term" keys. Long-term keys are kept offline whereas short-term keys are used in cryptographic operations. In case of a leak, it is possible to update short-term keys effectively, only by "reconfiguring" the CRS, without changing long-term keys. Similar ideas have been explored in authentication to allow execution of several authentication protocols dynamically. Other mechanisms that optimize security parameters depending on SoC behavior have also been proposed. While the above approaches discuss reconfiguration of some of the cryptographic primitives independently, to the best of the inventors' knowledge, there are no prior efforts in developing a comprehensive security architecture that can enable seamless reconfiguration of a wide variety of security primitives in NoC based SoCs.

Securing the SoC using security primitives implemented in the NoC has also been studied before in several directions. Lightweight security architectures for NoC based SoCs were proposed in "An Authenticated Encryption Based Security Framework For NoC Architectures" by K. Sajeesh and Hemangee K. Kapoor at 2011 *International Symposium on Electronic System Design*. IEEE (2011), pp. 134-139 and "Towards Protected MPSoC Communication For Information Protection Against A Malicious NoC" by Johanna Sepúlveda, Andreas Zankl, Daniel Flórez, and Georg Sigl at *Procedia Computer Science* Vol. 108 (2017), pp. 1103-1112. Intel introduced TinyCrypt, a cryptographic library with a small footprint, for constrained embedded and IoT devices. Prior efforts on lightweight encryption have targeted both IoT and RF communication. Fernando et al. presented a hash-based authentication scheme to prevent eavesdropping in wireless NoCs. See Fernando Pereñiguez-Garcia and José L Abellán, "Secure Communications in Wireless Network-on-Chips," *Proceedings of the 2nd International Workshop on Advanced Interconnect Solutions and Technologies for Emerging Computing Systems*. ACM (2017), pp. 27-32. Unfortunately, their mechanism incurs unacceptable performance overhead. Existing countermeasures for DoS attacks tried to prevent the hardware Trojan which causes the DoS attack from triggering, using techniques such as obfuscating packets through shuffling, inverting and scrambling. If the Trojan gets triggered, techniques such as latency monitoring, centralized on-chip traffic analysis, and security verification techniques tried to detect the attack. While previous work introduced a lightweight and distributed approach for DoS attack detection and localization, none of the above approaches consider reconfiguration of NoC security primitives. To the best of the inventors' knowledge, the present disclosure describes the first attempt to propose a reconfigurable security architecture for NoC based SoCs that can be dynamically reconfigured depending on use-case scenarios.

Accordingly, in the present disclosure, a reconfigurable security architecture is presented which allows enabling/disabling of security levels (tiers) depending on a use case scenario. Security cannot be considered alone in resource constrained IoT devices. For example, the interoperability constraints-performance, energy efficiency, and area should be taken into account when deciding the level of security required. The present disclosure presents various embodiments of a tier-based security architecture and an efficient reconfiguration mechanism that allows monitoring system characteristics and decides which security mechanism(s) to activate based on security policies. Exemplary tier-based security mechanisms are comprised of encryption, authentication, and DoS attack detection & localization. Experimental results show how different tiers can affect the interoperability constraints as well the security guarantees. An exemplary reconfigurable security architecture in accordance with the present disclosure is lightweight and provides real-time security guarantees. Therefore, it is ideal for resource-constrained IoT devices that have dynamic requirements and long application life, among other possible applications.

It should be emphasized that the above-described embodiments of the present disclosure are merely possible examples of implementations, merely set forth for a clear understanding of the principles of the disclosure. In one such embodiment, among others, a security system comprises a plurality of intellectual property cores 402 integrated on a system-on-chip, the plurality of intellectual property cores comprising a first intellectual property core 402; a network interface 404 integrated on the system-on-chip and connected to the first intellectual property core 402; a router 406 integrated on the system-on-chip and connected to the network interface 404 and at least one other router 406 integrated on the system-on-chip, wherein the network interface 404 is configured to process data transmitted between the first intellectual property core 402 and the router 406; wherein a security agent 408 integrated in the network interface 404 is configured to monitor system characteristics of embedded components on the system-on-chip and communicate a status of the system characteristics to a reconfigurable service engine 502; and the reconfigurable service engine 502 integrated on the system-on-chip, wherein the reconfigurable service engine 502 is configured to activate one of a plurality of tiers of security on the data transmitted between the intellectual property core 402 and the router 406 during runtime of the system-on-chip based at least upon the status of the system characteristics communicated by the security agent 408, the plurality of tiers of security comprising at least: a first tier for encrypting the transmitted data, a second tier for encrypting the transmitted data and authenticating the transmitted data, and a third tier for encrypting the transmitted data, authenticating the transmitted data, monitoring the transmitted data in order to detect a denial-of-service attack from the transmitted data, sending a message to the reconfigurable service engine 502 of a detected denial-of-service attack, and optionally localizing a source of the detected denial-of-service attack from the plurality of intellectual property cores 402.

Other systems, methods, and apparatus are also included in the present disclosure. Such a method, among others, includes embedding a security agent in a network interface of a network-on-chip based system-on-chip; monitoring, by the security agent, system characteristics of embedded components on the system-on-chip; communicating, by the security agent, a status of the system characteristics to a reconfigurable service engine that is integrated in the system-on-chip; and selecting to activate, by the reconfigurable service engine, one of a plurality of tiers of security on the data transmitted between an intellectual property core integrated on the system-on-chip and a router integrated on the system-on-chip during runtime of the system-on-chip, the plurality of tiers of security comprising at least: a first tier for encrypting the transmitted data, a second tier for encrypting the transmitted data and authenticating the transmitted data, and a third tier for encrypting the transmitted data, authenticating the transmitted data, monitoring the transmitted data in order to detect a denial-of-service attack from the transmitted data, sending a message to the reconfigurable service engine of a detected denial-of-service attack, and optionally localizing a source of the detected denial-of-service attack from the plurality of intellectual property cores.

Many variations and modifications may be made to the above-described embodiment(s) without departing substantially from the principles of the disclosure. All such modifications and variations are intended to be included herein within the scope of this disclosure and protected by the following claims.

The invention claimed is:

1. A system comprising:
   a plurality of intellectual property cores integrated on a system-on-chip, the plurality of intellectual property cores comprising a first intellectual property core;
   a network interface integrated on the system-on-chip and connected to the first intellectual property core;
   a router integrated on the system-on-chip and connected to the network interface and at least one other router integrated on the system-on-chip,
   wherein the network interface is configured to process data transmitted between the first intellectual property core and the router;
   wherein a security agent core integrated in the network interface is configured to monitor system characteristics of embedded components on the system-on-chip and communicate a status of the system characteristics to a reconfigurable service engine core; and
   the reconfigurable service engine core integrated on the system-on-chip, wherein the reconfigurable service engine core is configured to activate one of a plurality of tiers of security on the data transmitted between the first intellectual property core and the router during runtime of the system-on-chip based at least upon the status of the system characteristics communicated by the security agent core, the plurality of tiers of security comprising at least:
      a first tier for encrypting the transmitted data,
      a second tier for encrypting the transmitted data and authenticating the transmitted data, and
      a third tier for encrypting the transmitted data, authenticating the transmitted data, monitoring the transmitted data in order to detect a denial-of-service attack from the transmitted data, sending a message to the reconfigurable service engine core of a detected denial-of-service attack, and optionally localizing a source of the detected denial-of-service attack from the plurality of intellectual property cores.

2. The system of claim 1, wherein the reconfigurable service engine core is configured to, under the third tier of security, enable localization of the detected denial-of-service attack responsive to receiving the message of the detected denial-of-service attack from the security agent core.

3. The system of claim 1, wherein the reconfigurable service engine core is further configured to select one or more parameters for tuning the activated particular tier of security based on the status of the system characteristics communicated by the security agent core.

4. The system of claim 3, wherein the one or more parameters for the first tier of security are selected from blockcipher, key size, block size, and initialization vector length.

5. The system of claim 3, wherein the one or more parameters for the second tier of security are selected from hash function, key size, and input size.

6. The system of claim 3, wherein the one or more parameters for the third tier of security are selected from detection only/detection & localization and a detection interval.

7. The system of claim 3, further comprising reconfiguration registers integrated at the network interface which are modifiable by the security agent core to indicate which of the plurality of tiers of security are activated or deactivated and to indicate values for the one or more parameters.

8. The system of claim 7, further comprising a plurality of network interfaces, wherein each of the plurality of intellectual property cores is connected to an individual one of the plurality of network interfaces, wherein at least one reconfiguration register at each of the plurality of network interfaces is set to indicate the particular tier of security that is to be activated by the reconfigurable service engine core, wherein each of the plurality of intellectual property cores is configured to read the at least one reconfiguration register.

9. The system of claim 1, wherein the system characteristics comprise network-on-chip congestion information.

10. The system of claim 9, wherein the network-on-chip congestion information comprises packet arrival information that are obtained from the router, wherein the packet arrival information is used by the security agent core to detect the denial-of-service attack.

11. The system of claim 8, wherein each of the intellectual property cores is configured to analyze packet latency information and use the packet latency information attempt to localize the source of the denial-of-service attack.

12. The system of claim 1, wherein the system characteristics comprises a battery level of the system-on-chip.

13. The system of claim 1, wherein the reconfigurable service engine core periodically requests for the status of the system characteristics from the security agent core.

14. The system of claim 1, wherein the reconfigurable service engine core and the security agent core communicate using a network-on-chip without interfering with data transferred between the plurality of intellectual property cores.

15. A method comprising:
   embedding a security agent in a network interface of a network-on-chip based system-on-chip;
   monitoring, by the security agent, system characteristics of embedded components on the system-on-chip;

communicating, by the security agent, a status of the system characteristics to a reconfigurable service engine that is integrated in the system-on-chip; and selecting to activate, by the reconfigurable service engine, one of a plurality of tiers of security on data transmitted between an intellectual property core integrated on the system-on-chip and a router integrated on the system-on-chip during runtime of the system-on-chip, the plurality of tiers of security comprising at least:
- a first tier for encrypting the transmitted data,
- a second tier for encrypting the transmitted data and authenticating the transmitted data, and
- a third tier for encrypting the transmitted data, authenticating the transmitted data, monitoring the transmitted data in order to detect a denial-of-service attack from the transmitted data, sending a message to the reconfigurable service engine of a detected denial-of-service attack, and optionally localizing a source of the detected denial-of-service attack from a plurality of intellectual property cores integrated on the system-on-chip, the plurality of intellectual property cores comprising the intellectual property core.

16. The method of claim 15, further comprising enabling, by the reconfigurable service engine, localization of the detected denial-of-service attack under the third tier of security responsive to receiving the message of the detected denial-of-service attack from the security agent.

17. The method of claim 15, further comprising selecting, by the reconfigurable service engine, one or more parameters for tuning the activated particular tier of security based on the status of the system characteristics communicated by the security agent.

18. The method of claim 17, further comprising modifying, by the security agent, reconfiguration registers integrated at the network interface to indicate which of the plurality of tiers of security are activated or deactivated and to indicate values for the one or more parameters.

19. The method of claim 15, wherein the reconfigurable service engine and the security agent communicate using a network-on-chip without interfering with data transferred between the plurality of intellectual property cores.

20. A system comprising:
- a plurality of intellectual property cores integrated on a system-on-chip, the plurality of intellectual property cores comprising a first intellectual property core;
- a network interface integrated on the system-on-chip and connected to the first intellectual property core;
- a router integrated on the system-on-chip and connected to the network interface and at least one other router integrated on the system-on-chip,
- wherein the network interface is configured to process data transmitted between the first intellectual property core and the router;
- wherein a security agent core integrated in the network interface is configured to monitor system characteristics of embedded components on the system-on-chip and communicate a status of the system characteristics to a reconfigurable service engine core; and
- the reconfigurable service engine core integrated on the system-on-chip, wherein the reconfigurable service engine core is configured to activate one of a plurality of tiers of security on the data transmitted between the first intellectual property core and the router during runtime of the system-on-chip based at least upon the status of the system characteristics communicated by the security agent core, wherein the plurality of tiers of security comprise at least a first tier for encrypting the transmitted data and a second tier for encrypting the transmitted data and authenticating the transmitted data.

* * * * *